US012812076B2

(12) United States Patent
Park et al.

(10) Patent No.: US 12,812,076 B2
(45) Date of Patent: Nov. 24, 2026

(54) ELECTRONIC APPARATUS AND CONTROLLING METHOD THEREOF

(71) Applicant: SAMSUNG ELECTRONICS CO., LTD., Suwon-si (KR)

(72) Inventors: Kihong Park, Suwon-si (KR); Hakjae Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 420 days.

(21) Appl. No.: 18/386,789

(22) Filed: Nov. 3, 2023

(65) Prior Publication Data

US 2024/0080422 A1 Mar. 7, 2024

Related U.S. Application Data

(63) Continuation of application No. PCT/KR2022/007073, filed on May 17, 2022.

(30) Foreign Application Priority Data

Jul. 5, 2021 (KR) ........................ 10-2021-0087683

(51) Int. Cl.
*G03B 21/14* (2006.01)
*H04N 9/31* (2006.01)

(52) U.S. Cl.
CPC ......... *H04N 9/3185* (2013.01); *H04N 9/3194* (2013.01)

(58) Field of Classification Search
CPC .... G03B 21/147; G03B 21/14; H04N 9/3185; H04N 9/3179
See application file for complete search history.

(56) References Cited

U.S. PATENT DOCUMENTS 7,347,564 B2 3/2008 Matsumoto et al.
2011/0221753 A1 9/2011 Tsukagoshi
(Continued)

FOREIGN PATENT DOCUMENTS

JP 5-188346 A 7/1993
JP 2008-268624 A 11/2008
(Continued)

OTHER PUBLICATIONS

Ozawa, Takashi, JP2008-268624A Machine Translation into English; Jan. 23, 2026 (Year: 2008).*
(Continued)

*Primary Examiner* — Ryan D Howard
(74) *Attorney, Agent, or Firm* — Sughrue Mion, PLLC

(57) ABSTRACT

Provided is an electronic apparatus including a memory; a sensor; a projection part configured to output an image onto a projection surface, and at least one processor configured to: obtain a first image including a content, obtain inclination information of the electronic apparatus using the sensor, identify a first area in which the first image is displayed and a second area in which the first image is not displayed based on the inclination information, change a size of the first image based on the size of the first area, control the projection part to output the first image having the changed size onto the first area, and control the projection part to output, onto the second area, a second image including additional information based on the inclination information and a size of the second area.

15 Claims, 29 Drawing Sheets

(56) References Cited

U.S. PATENT DOCUMENTS

| | | | |
|---|---|---|---|
| 2013/0106840 A1 | 5/2013 | Lee et al. | |
| 2016/0094821 A1* | 3/2016 | Mori | H04N 9/3147 353/30 |
| 2018/0220112 A1* | 8/2018 | Miichi | H05B 47/00 |
| 2019/0394435 A1* | 12/2019 | Uemura | G06T 3/00 |
| 2021/0158730 A1 | 5/2021 | Kondo et al. | |

FOREIGN PATENT DOCUMENTS

| | | | |
|---|---|---|---|
| JP | 2011-48038 | A | 3/2011 |
| JP | 2013-74539 | A | 4/2013 |
| JP | 2013-125055 | A | 6/2013 |
| JP | 6255705 | B2 | 1/2018 |
| JP | 2020-13196 | A | 1/2020 |
| KR | 10-0739824 | B1 | 7/2007 |
| KR | 10-1223067 | B1 | 1/2013 |
| KR | 10-2013-0043300 | A | 4/2013 |
| KR | 10-2014-0100105 | A | 8/2014 |
| KR | 10-1465497 | B1 | 11/2014 |
| KR | 10-2015-0075664 | A | 7/2015 |

OTHER PUBLICATIONS

International Search Report (PCT/ISA/210) issued on Aug. 18, 2022 by the International Searching Authority in International Patent Application No. PCT/KR2022/007073.

Written Opinion (PCT/ISA/237) issued on Aug. 18, 2022 by the International Searching Authority in International Patent Application No. PCT/KR2022/007073.

Communication issued on Oct. 31, 2025 by the Korean Ministry of Intellectual Property (MOIP) in Korean Patent Application No. 10-2021-0087683.

* cited by examiner

ELECTRONIC APPARATUS AND CONTROLLING METHOD THEREOF

CROSS-REFERENCE TO RELATED APPLICATIONS

This application is a bypass continuation application of International Application No. PCT/KR2022/007073, filed on May 17, 2022, which is based on and claims the benefit of Korean Patent Application No. 10-2021-0087683, filed on Jul. 5, 2021, in the Korean Intellectual Property Office, the disclosures of each of which are incorporated by reference herein in their entireties.

BACKGROUND

1. Field

The disclosure relates to an electronic apparatus and a method for controlling thereof and, more particularly, to an electronic apparatus that outputs an image and additional information together onto a projection surface and a method for controlling thereof.

2. Description of Related Art

When a projector outputs an image onto a projection surface, an output image may not be in a rectangular shape due to physical inclination of a projector. In addition, the output image may be in a rotated state in a clockwise direction or a counterclockwise direction based on a direction facing the projection surface.

When an image output from a projector is not output in a rectangular shape or output in a rotated state, a user may see a distorted image. In order to correct a distorted image, a projector may perform keystone correction. The keystone correction may be an operation of correcting an image so that an image is displayed to an image of a not distorted rectangular shape.

When an image is changed through keystone correction, an output area of an image may become different. For example, an image is output in an area of a first size before keystone correction, but after keystone correction, an image may be output onto an area of a second size. If the first size is larger than the second size, the size of the area output through keystone correction may become smaller.

In order not to change the size of the output area, the projector must change the outputtable area. However, in order to change the outputtable area, it may be necessary to change the projection setting of the project. If the projection setting is changed, there may be a problem that the resolution of the image is changed or the sharpness is lowered.

Accordingly, in order to output an image for which keystone correction is performed without changing the outputtable area, the size of the area in which the image is output may be reduced. When the size of the area in which the image is output becomes smaller, the remaining area may occur. Specifically, an area other than an area in which an image for which keystone correction is performed is displayed in the outputtable area may be identified as the remaining area.

Here, an image is not output onto the identified remaining area, utilization of the remaining area may be a problem.

SUMMARY

Provided are an electronic apparatus for outputting a second image in a second area where a first image is not displayed by identifying a first area for outputting the first image and a second area for outputting a second image including additional information based on the inclination information and a method for controlling thereof.

According to an aspect of the disclosure, there is provided an electronic apparatus including: a memory; a sensor; a projection part configured to output an image onto a projection surface; and at least one processor configured to: obtain a first image including a content, obtain inclination information of the electronic apparatus using the sensor, identify a first area in which the first image is displayed and a second area in which the first image is not displayed based on the inclination information, change a size of the first image based on the size of the first area, control the projection part to output the first image having the changed size onto the first area, and control the projection part to output, onto the second area, a second image including additional information based on the inclination information and a size of the second area.

The at least one processor may be further configured to: rotate the first image based on the inclination information, adjust the first image by changing a width and a height of the first image based on a width and a height of the first area, and control the projection part to output the adjusted first image corresponding to the first area.

The at least one processor may be further configured to: rotate the second image based on the inclination information, and adjust the second image by changing a size of the second image based on the size of the second area, and control the projection part to output the adjusted second image corresponding to the second area.

The inclination information may include an inclination direction, the at least one processor may be further configured to adjust the first image and the second image by rotating the first image and the second image in a reverse direction of the inclination direction, the inclination direction may be a clockwise direction or a counterclockwise direction based on a direction that the projection surface faces.

The sensor may include at least one of an inclination sensor for sensing inclination of the electronic apparatus or an image sensor for capturing an image, the at least one processor may be further configured to obtain the inclination direction based on sensing data obtained from the sensor.

The at least one processor may be further configured to, based on a plurality of second areas, obtain a size of the plurality of second areas, and control the projection part to output the second image in the second area having a largest size among the plurality of second areas.

The at least one processor may be further configured to: identify an output area in which an image is output through the projection part, identify the first area to which the adjusted first image is output, and identify, as the second area, an area excluding the first area from among the output area.

The at least one processor may be configured to control the projection part to output a background color of the second area as a predetermined color.

The sensor may include an image sensor for capturing an image, and the at least one processor may be configured to: identify a color of the projection surface based on the image captured through the image sensor, and identify the predetermined color based on the identified color of the projection surface.

The at least one processor may be further configured to control the projection part to output the inclination information and a guide user interface to rotate the second image.

According to an aspect of the disclosure, there is provided method of controlling an electronic apparatus to output an image onto a projection surface, the method including: obtaining a first image including a content; obtaining inclination information of the electronic apparatus; identifying a first area for displaying the first image and a second area in which the first image is not displayed based on the inclination information; changing a size of the first image based on a size of the first area; outputting the first image with the size changed onto the first area; and outputting, onto the second area, a second image including additional information based on the inclination information and a size of the second area.

The changing the size of the first image may include rotating the first image based on the inclination information, adjusting the first image by changing a width and a height of the first image based on a width and a height of the first area, and the outputting the first image may include outputting the adjusted first image corresponding to the first area.

The method may further include: rotating the second image based on the inclination information, adjusting the second image by changing a size of the second image based on the size of the second area, and the providing the second image may include outputting the adjusted second image corresponding to the second area.

The inclination information may include an inclination direction, the method may further include adjusting the first image and the second image by rotating the first image and the second image in a reverse direction of the inclination direction, and the inclination direction may be a clockwise direction or a counterclockwise direction based on a direction that the projection surface faces.

The sensor may include at least one of an inclination sensor for sensing inclination of the electronic apparatus or an image sensor for capturing an image, and the obtaining the inclination information may include obtaining the inclination direction based on sensing data obtained from a sensor.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The disclosure will be described in greater detail with reference to the attached drawings.

The terms used in the disclosure and the claims are general terms identified in consideration of the functions of embodiments of the disclosure. However, these terms may vary depending on intention, legal or technical interpretation, emergence of new technologies, and the like of those skilled in the related art. In addition, in some cases, a term may be selected by the applicant, in which case the term will be described in detail in the description of the corresponding disclosure. Thus, the term used in this disclosure should be defined based on the meaning of term, not a simple name of the term, and the contents throughout this disclosure.

Expressions such as "have," "may have," "include," "may include" or the like represent presence of corresponding numbers, functions, operations, or parts, and do not exclude the presence of additional features.

Expressions such as "at least one of A or B" and "at least one of A and B" should be understood to represent "A," "B" or "A and B."

As used herein, terms such as "first," and "second," may identify corresponding components, regardless of order and/or importance, and are used to distinguish a component from another without limiting the components.

In addition, a description that one element (e.g., a first element) is operatively or communicatively coupled with/to" or "connected to" another element (e.g., a second element) should be interpreted to include both the first element being directly coupled to the second element, and the first element being indirectly coupled to the second element through a third element.

A singular expression includes a plural expression, unless otherwise specified. It is to be understood that terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

A term such as "module," "unit," and "part," is used to refer to an element that performs at least one function or operation and that may be implemented as hardware or software, or a combination of hardware and software. Except when each of a plurality of "modules," "units," "parts," and the like must be realized in an individual hardware, the components may be integrated in at least one module or chip and be realized in at least one processor.

In the following description, a "user" may refer to a person using an electronic apparatus or an artificial intelligence electronic apparatus using an electronic apparatus (e.g., artificial intelligence electronic apparatus).

An embodiment of the disclosure will be described in more detail with reference to the accompanying drawings.

Figure 1:
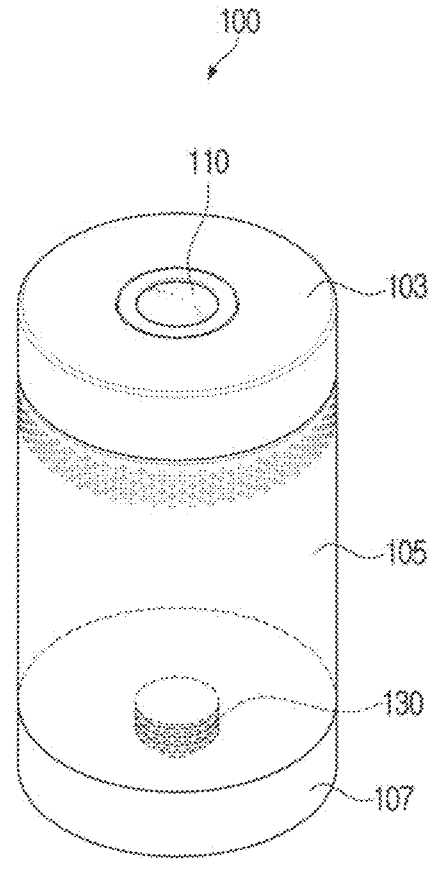
FIG. 1 is a perspective view illustrating an external appearance of the electronic apparatus, according to one or more embodiments of the disclosure.

FIG. 1 is a perspective view illustrating an exterior of an electronic apparatus 100 according to one or more embodiments of the disclosure.

Referring to FIG. 1, the electronic apparatus 100 may include a head 103, a main body 105, a projection lens 110, a connector 130, or a cover 107.

The electronic apparatus 100 may be devices in various forms. In particular, the electronic apparatus 100 may be a projector device that enlarges and projects an image to a wall or a screen, and the projector device may be an LCD projector or a digital light processing (DLP) type projector that uses a digital micromirror device (DMD).

Also, the electronic apparatus 100 may be a display device for households or for an industrial use. Alternatively, the electronic apparatus 100 may be an illumination device used in everyday lives, or an audio device including an audio module, and it may be implemented as a portable communication device (e.g.: a smartphone), a computer device, a portable multimedia device, a wearable device, or a home appliance, etc. The electronic apparatus 100 according to one or more embodiments of the disclosure is not limited to the aforementioned devices, and the electronic apparatus 100 may be implemented as an electronic apparatus 100 equipped with two or more functions of the aforementioned devices. For example, according to a manipulation of a processor, a projector function of the electronic apparatus 100 is turned off, and an illumination function or a speaker function is turned on, and the electronic apparatus 100 may be utilized as a display device, an illumination device, or an audio device. Also, the electronic apparatus 100 may include a microphone or a communication device, and may be utilized as an AI speaker.

The main body 105 is a housing constituting the exterior, and it may support or protect the components of the electronic apparatus 100 (e.g., the components illustrated in FIGS. 2*a* and 2*b*) that are arranged inside the main body 105. The shape of the main body 105 may have a structure close to a cylindrical shape as illustrated in FIG. 1. However, the shape of the main body 105 is not limited thereto, and according to the various embodiments of the disclosure, the main body 105 may be implemented as various geometrical shapes such as a column, a cone, a sphere, etc. having polygonal cross sections.

The size of the main body 105 may be a size that a user can grip or move with one hand, and the main body 105 may be implemented as a micro size so as to be easily carried, or it may be implemented as a size that may be held on a table or that may be coupled to an illumination device.

Also, the material of the main body 105 may be implemented as a matt metallic or synthetic resin such that a user's fingerprint or dust does not smear it. Alternatively, the exterior of the main body 105 may consist of a slick glossy material.

In the main body 105, a friction area may be formed in a partial area of the exterior of the main body 105 such that a user can grip and move the main body 105. Alternatively, in the main body 105, a bent gripping part or a support 108*a* (refer to FIG. 3) that may be gripped by a user may be provided in at least a partial area.

The projection lens 110 is formed on one surface of the main body 105, and is formed to project a light that passed through a lens array to the outside of the main body 105. The projection lens 110 according to the various embodiments of the disclosure may be an optical lens which was low-dispersion coated for reducing chromatic aberration. Also, the projection lens 110 may be a convex lens or a condensing lens, and the projection lens 110 according to one or more embodiments of the disclosure may adjust the focus by adjusting locations of a plurality of sub lenses.

The head 103 may be provided to be coupled to one surface of the main body 105, and it can support and protect the projection lens 110. Also, the head 103 may be coupled to the main body 105 so as to be swiveled within a predetermined angle range based on one surface of the main body 105.

The head 103 may be automatically or manually swiveled by a user or the processor, and it may freely adjust a projection angle of the projection lens 110. Alternatively, although not illustrated in the drawings, the head 103 may include a neck that is coupled to the main body 105 and that extends from the main body 105, and the head 103 may adjust a projection angle of the projection lens 110 as it is tipped or inclined.

The electronic apparatus 100 may project a light or an image to a desired location by adjusting an emission angle of the projection lens 110 while adjusting the direction of the head 103 in a state wherein the location and the angle of the main body 105 are fixed. Also, the head 103 may include a handle that a user can grip after rotating in a desired direction.

On an outer circumferential surface of the main body 105, a plurality of openings may be formed. Through the plurality of openings, audio output from an audio output part may be output onto the outside of the main body 105 of the electronic apparatus 100. The audio output part may include a speaker, and the speaker may be used for general uses such as reproduction of multimedia or reproduction of recording, output of a voice, etc.

According to one or more embodiments of the disclosure, a radiation fan (not shown) may be provided inside the main body 105, and when the radiation fan (not shown) is operated, air or heat inside the main body 105 may be discharged through the plurality of openings. Accordingly, the electronic apparatus 100 may discharge heat generated by the driving of the electronic apparatus 100 to the outside, and prevent overheating of the electronic apparatus 100.

The connector 130 may connect the electronic apparatus 100 with an external device and transmit or receive electronic signals, or it may be supplied with power from the outside. The connector 130 according to one or more embodiments of the disclosure may be physically connected with an external device. Here, the connector 130 may include an input/output interface, and it may connect communication with an external device, or it may be supplied with power via wire or wirelessly. For example, the connector 130 may include an HDMI connection terminal, a USB connection terminal, an SD card accommodating groove, an audio connection terminal, or a power consent. Alternatively, the connector 130 may include a Bluetooth, Wi-Fi, or wireless charge connection module that is connected with an external device wirelessly.

Also, the connector 130 may have a socket structure connected to an external illumination device, and it may be connected to a socket accommodating groove of an external illumination device and supplied with power. The size and specification of the connector 130 of a socket structure may be implemented in various ways in consideration of an accommodating structure of an external device that may be coupled. For example, according to the international standard E26, a diameter of a joining part of the connector 130 may be implemented as 26 mm, and in this case, the electronic apparatus 100 may be coupled to an external illumination device such as a stand in place of a light bulb that is generally used. Meanwhile, when coupled to a conventional socket located on a ceiling, the electronic apparatus 100 has a structure of being projected from up to down, and in case the electronic apparatus 100 does not rotate by socket-coupling, the screen cannot be rotated, either. Accordingly, in case power is supplied as the electronic apparatus 100 is socket-coupled, in order that the electronic apparatus 100 can rotate, the head 103 is swiveled on one surface of the main body 105 and adjusts an emission angle while the electronic apparatus 100 is socket-coupled to a stand on a ceiling, and accordingly, the screen may be emitted to a desired location, or the screen may be rotated.

The connector 130 may include a coupling sensor, and the coupling sensor may sense whether the connector 130 and an external device are coupled, a coupled state, or a subject for coupling, etc. and transmit the information to the processor, and the processor may control the driving of the electronic apparatus 100 based on the transmitted detection values.

The cover 107 may be coupled to or separated from the main body 105, and it may protect the connector 130 such that the connector 130 is not exposed to the outside at all times. The shape of the cover 107 may be a shape of being continued to the main body 105 as illustrated in FIG. 1. Alternatively, the shape may be implemented to correspond to the shape of the connector 130. Also, the cover 107 may support the electronic apparatus 100, and the electronic apparatus 100 may be coupled to the cover 107, and may be used while being coupled to or held on an external holder.

In the electronic apparatus 100 according to the various embodiments of the disclosure, a battery may be provided inside the cover 107. The battery may include, for example, a primary cell that cannot be recharged, a secondary cell that may be recharged, or a fuel cell.

Although not illustrated in the drawings, the electronic apparatus 100 may include a camera module, and the camera module may photograph still images and moving images. According to one or more embodiments of the disclosure, the camera module may include one or more lenses, an image sensor, an image signal processor, or a flash.

Also, although not illustrated in the drawings, the electronic apparatus 100 may include a protection case (not shown) such that the electronic apparatus 100 may be easily carried while being protected. Alternatively, the electronic apparatus 100 may include a stand (not shown) that supports or fixes the main body 105, and a bracket (not shown) that may be coupled to a wall surface or a partition.

In addition, the electronic apparatus 100 may be connected with various external devices by using a socket structure, and provide various functions. As an example, the electronic apparatus 100 may be connected with an external camera device by using a socket structure. The electronic apparatus 100 may provide an image stored in a connected camera device or an image that is currently being photographed by using a projection part 111. As another example, the electronic apparatus 100 may be connected with a battery module by using a socket structure, and supplied with power. The electronic apparatus 100 may be connected with an external device by using a socket structure, but this is merely an example, and the electronic apparatus 100 may be connected with an external device by using another interface (e.g., a USB, etc.).

Figure 2A:
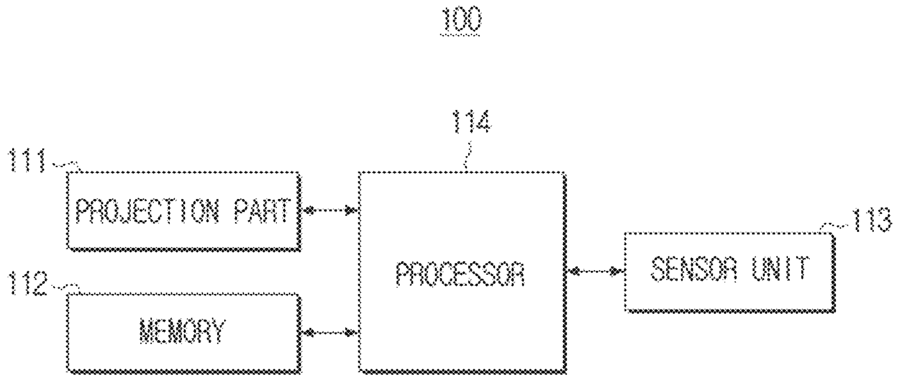
FIG. 2A is a block diagram illustrating the electronic apparatus, according to one or more embodiments of the disclosure.

FIG. 2A is a block diagram illustrating the electronic apparatus according to one or more embodiments of the disclosure.

Referring to FIG. 2A, the electronic apparatus 100 may include the projection part 111, a memory 112, a sensor unit 113, and a processor 114.

The projection part 111 may perform a function of outputting an image on a projection surface. A specific description related to the projection part 111 will be described in FIG. 2B. Here, the term projection part is used, but the electronic apparatus 100 may project an image by various methods. The projection part 111 may include a projection lens 110. The projection surface may be a part of a physical space or a separate screen onto which an image is output.

The memory 112 may store the first image and the second image output on the projection surface. A specific description related to the memory 112 will be described in FIG. 2B.

The sensor unit 113 may include at least one sensor. To be specific, the sensor unit 113 may include at least one of an inclination sensor to sense inclination of the electronic apparatus 100 or an image sensor to photograph an image. Here, the inclination sensor may be an acceleration sensor or a gyro sensor, and an image sensor may denote a camera or a depth camera. In addition, the sensor unit 113 may include various sensors other than the inclination sensor or the image sensor. For example, the sensor unit 113 may include an illuminance sensor and a distance sensor. Further, the sensor unit 113 may include a LiDAR sensor.

The processor 114 may perform an overall control operation of the electronic apparatus 100. To be specific, the processor 114 may perform a function to control overall operation of the electronic apparatus 100. The processor 114 may be a single processor or a plurality of processors.

The processor 114 may include the projection part 111. Here, the projection part 111 may output an image onto a projection surface.

The processor 114 may obtain a first image including a content from the memory 112, obtain inclination information of the electronic apparatus 100 through the sensor unit 113, identify a first area in which the first image is displayed and a second area in which the first image is not displayed based on the inclination information, change size of the first image based on the size of the first area, control the projection part 111 to output the first image, the size of which has been changed, onto the first area, and control the projection part 111 to output, onto the second area, a second image including additional information based on the inclination information and the size of the second area.

Here, the processor 114 may obtain a first image stored in the memory 112. Here, the first image may mean an image corresponding to a user input, and may be an image including content. For example, when a user input for outputting the first content is received, the processor 114 may obtain a first image corresponding to the first content from the memory 112.

Here, the processor 114 may obtain the second image stored in the memory 112. Here, the second image may be an image including additional information. Here, the additional information may include at least one of information of time, weather, advertisement, or information corresponding to the first image.

Here, the information corresponding to the first image may include at least one of a content name corresponding to the first image, a content playback time corresponding to the first image, or content script information corresponding to the first image.

Here, the processor 114 may sense inclination information of the electronic apparatus 100 through the sensor unit 113. Here, sensor unit 113 may mean an inclination sensor. Here, sensor unit 113 may include at least one sensor of an acceleration sensor or a gyro sensor. The processor 114 may obtain inclination information of the electronic apparatus 100 based on sensing data obtained through the sensor unit 113.

Here, the processor 114 may receive a user input for outputting a first image including content. When a user input is received, the processor 114 may identify a first area to output the first image. Here, the first area may mean a region corrected based on the inclination information. If the first image is output as it is without a separate correction operation, the output first image may be output in a state in which the electronic apparatus 100 is inclined as much as the inclination. A description related thereto is described in FIG. 5.

Here, the processor 114 may rotate the first image based on the inclination information. In addition, the processor 114 may identify an area, as the first area, in which the rotated first image out of the outputtable area is output to be the largest. Here, the outputtable area may not be changed notwithstanding rotation of the first image. If the outputtable area is not changed, sharpness of an image may be maintained.

Here, according to one or more embodiments, a size ratio of a rotated first image may be maintained in identifying an area in which the rotated first image out of an outputtable area is to be output. For example, when the first image has a rectangular shape, the processor 114 may identify the first area while maintaining the width to height ratio (or aspect ratio) of the rotated first image. As another example, when the first image has a circular shape, the processor 114 may identify the first area while maintaining the curvature of the rotated first image. A detailed description related to the same is described in FIG. 14.

Here, according to another embodiment, the size ratio of the rotated first image may not be maintained (or may be changed) in identifying an area in which the rotated first image is to be output to be the largest in the outputtable area. For example, when the first image is a rectangular shape, the processor 114 may identify a first area while not maintaining (or changing) width to height ratio of the rotated first image. As another example, when the first image is a circular shape, the processor 114 may identify the first area while not maintaining (or changing) the curvature of the rotated image. A specific description related thereto will be described in FIG. 15.

In addition, the processor 114 may identify an area in which the first image is not output in the outputtable area as the second area. Here, the second area may be an area included in a remaining area (or residual area, or unused area, or gray area) excluding the first area among the outputtable areas. Here, the processor 114 may rotate the second image based on the inclination information. In addition, the processor 114 may identify, as the second area, an area in which the rotated second image is output to be the largest out of the remaining area.

Here, according to one or more embodiments, in identifying an area in which the rotated image is to be output to be the largest out of the outputtable area, the size ratio of the second image may be maintained. Here, according to another embodiment, the size ratio of the rotated second image may not be maintained (or changed) in identifying an area in which the rotated second image is output to be largest out of the outputtable area. A specific example is the same as the first image and a duplicate description will be omitted.

Here, the processor 114 may change the size of the rotated first image based on the identified size of the first area. In addition, the processor 114 may control the projection part 111 to output the changed first image on the first area.

Here, the processor 114 may change the size of the rotated second image based on the size of the identified second area. The processor 114 may control the projection part 111 to output the changed second image on the second area.

The processor 114 may rotate the first image based on the inclination information, correct the first image by changing the width and height of the first image based on the width and the height of the first area, and control the projection part 111 to output the corrected first image corresponding to the first area.

Here, the first image may be a rectangular shape. The object (major content details) included in the first image may have various types.

For example, the size of the first image before correction may be 1920×1080. However, the first image before correction may be output to an inclined state due to inclination of the electronic apparatus 100.

Accordingly, the processor 114 may rotate and output the first image as much as the inclination of the electronic apparatus 100. Here, the processor 114 may not change the outputtable area for clarity of the image. When the first image is rotated, the image may be beyond the outputtable area and the processor 114 may reduce the size of the rotated first image and output the reduced first image. Here, the processor 114 may identify a first area in which a first image having a reduced size is output. Here, the processor 114 may obtain a width and a height of the first area. The processor 114 may change the width and the height of the rotated first image based on the obtained width and the height of the first area. For example, the size of the changed first image may be 1600×900. According to one or more embodiments, in identifying the first area, the ratio of width to height may be maintained at 16:9. However, according to another embodiment, in identifying the first area, the ratio of the width to the length may be changed.

Here, the processor 114 may control the projection part 111 to output the corrected first image corresponding to the size of the first area to the first area.

The processor 114 may rotate the second image based on the inclination information, correct the second image by changing the size of the second image based on the size of the second area, and control the projection part 111 to output the corrected second image corresponding to the second area.

Here, the second image may be a rectangular shape. An object (additional information) included in the second image may have various types.

Here, the processor 114 may rotate the second image based on the inclination information. In addition, the processor 114 may identify an area, as the second area, in which the second image may be output to be the largest in the remaining area. The processor 114 may correct the rotated second image based on the size of the second area. A further description is the same as a correction operation of the first image, and thus a redundant description thereof is omitted.

The inclination information may include at least one of an inclination direction or an inclination angle. Here, the Inclination direction may be a clockwise or counterclockwise direction with respect to the projection surface, and the incidence angle may be an angle between a horizontal plane and a horizontal axis of the electronic apparatus 100.

According to one or more embodiments, the inclination information may include inclination direction. Here, the processor 114 may rotate the first image and the second image in a reverse direction of the inclination direction for correction.

According to another embodiment, the inclination information may include an inclination angle. Here, the processor 114 may rotate the first image and the second image by an inclination angle for correction.

According to still another embodiment, the inclination information may include inclination direction and inclination angle. Here, the processor 114 may correct the images by rotating the first image and the second image by an inclination angle in the reverse direction of the inclination direction.

Here, the processor 114 may obtain inclination information of the electronic apparatus 100 through the sensor unit 113. It is assumed that the inclination information indicates that the electronic apparatus 100 is inclined counterclockwise by five degrees based on a direction facing the projection surface. When the image is not rotated, the first image and the second image may be output onto the projection surface by being inclined counterclockwise by five degrees based on a direction facing the projection surface.

Therefore, the processor 114 may rotate the first image and the second image as much as the inclination angle of the electronic apparatus 100 in the reverse direction (clockwise) of the counterclockwise direction which is the inclination direction of the electronic apparatus 100. The description related to the inclination information will be described in FIG. 6.

The sensor unit 113 may include at least one of an inclination sensor for sensing the inclination of the electronic apparatus 100 or an image sensor for photographing an image, and the processor 114 may obtain at least one of an inspection direction or an inclination angle based on the sensing data obtained from the sensor unit 113.

According to one or more embodiments, the sensor unit 113 may include an inclination sensor. Here, the inclination sensor may be a sensor for sensing inclination of the electronic apparatus 100. For example, the inclination sensor may be an acceleration sensor or gyro sensor.

According to another embodiment, the sensor unit 113 may include an image sensor. Here, the image sensor may be a sensor for photographing the front of the electronic apparatus 100. The processor 114 may control the projection part 111 to output an image (guide image) on the projection surface, and may obtain an image photographed through an image sensor. Here, the processor 114 may identify a boundary line between the output image (guide image) and the projection surface by analyzing the photographed image. The processor 114 may obtain inclination information of the electronic apparatus 100 by comparing the angle between the output image and the boundary line of the projection surface. When the boundary line of the projection surface and the output image (guide image) are parallel, the processor 114 may determine that the electronic apparatus 100 is not inclined. However, when the boundary line of the projection surface is not parallel to the output image (the guide image), the processor 114 may determine that the electronic apparatus 100 is inclined.

Here, the processor 114 may obtain sensing data through the sensor unit 113, and may obtain inclination direction and inclination angle through the obtained sensing data.

When the second area is plural, the processor 114 may obtain size (or area or extent) of the plurality of second areas, and may control the projection part 111 to output the second image in an area having the largest size (or area or extent) among a plurality of second areas.

Here, the processor 114 may identify a second area in which the corrected (changed) first image is not output among the outputtable areas. Here, the second area may mean the remaining area. If it is identified that there are a plurality of second areas, the processor 114 may obtain a size (or area or extent) of each of the plurality of second areas. Then, an area having the largest size (or area or extent) among the plurality of second areas may be identified. The processor 114 may control the projection part 111 to output the second image to the identified area. Only when the second image is output in an area having a large size (or area or extent), the second image may be output in the largest size.

The processor 114 may identify an outputtable area (or output area or output region) in which an image may be output through the projection part 111, identify a first area in which the corrected first image is output, and identify an area other than the first area in the outputtable area (or the area with possible image output) as a second area.

The second area may mean a remaining area in which the first image is not output, among the outputtable areas. Here, the processor 114 may output the second image at a location (area) where the second image may be output to be the largest out of the second area.

A specific description related to the second area and an operation of outputting the second image will be described in FIGS. 11 to 18.

The processor 114 may control the projection part 111 to output the background color of the second area to a predetermined color.

Here, the second area may be an area in which the first image corresponding to the user input is not output, and may be an area in which additional information is output. Therefore, the second area may be displayed in a color that does not interfere with the output of the first image as much as possible. Specifically, the background color of the second area may mean a predetermined color that does not interfere with the output of the first image.

Here, the background color of the second area may be a color of at least one of white, black, or gray.

Meanwhile, according to another embodiment, the processor 114 may determine the background color of the second area as a transparent color. Here, if the background color of the second area is transparent, the processor 114 may not output any image on the background of the second area. Specifically, the processor 114 may output the second image and may not output any image other than the second image in relation to the second area. Meanwhile, when the background color of the second area is displayed as a transparent color, the user may display only the second image in a state in which the user cannot recognize the second area.

The sensor unit 113 may include an image sensor that photographs an image, and the processor 114 may identify the color of the projection surface based on the image photographed through the image sensor, and change (or correct) the background color based on the identified color of the projection surface. Specifically, if the background color is a predetermined first color (basic color), the processor 114 may change the background color from the first color to a second color different from the first color based on the identified projection surface. For example, it is assumed that the projection surface is identified as white and the basic color of the background color is black. The processor 114 may change the background color from black to white so that the background color corresponds to the color (white) of the projection surface.

The processor 114 may obtain a photographed image by photographing a projection surface through an image sensor. The processor 114 may identify a color of the projection surface based on the photographed image. In addition, the processor 114 may determine the color of the identified projection surface as the background color of the second area. The processor 114 may control the projection part 111 to output a background color of the determined second area. A detailed description related to the same will be described later with reference to FIGS. 21 and 22.

The processor 114 may control the projection part 111 to output inclination information and a guide UI to rotate the second image.

Here, the processor 114 may output the inclination information on the projection surface. The projection part 111 may be controlled to output a UI for guiding rotation of the second image on the projection surface other than the inclination information. A detailed description related thereto will be described later with reference to FIG. 23.

The processor 114 may control the projection part 111 to output a UI for guiding the already-rotated first image to additionally rotate. A specific description related thereto will be described in FIG. 24.

When data is included in the second image, the processor 114 may output only the second image to the second area without displaying the first image. For example, when a predetermined type of data is included in the second image, the processor 114 may output only the second image to the second area in a state in which the first image is not displayed.

The processor 114 may additionally identify an area capable of outputting the first image and the second image but not outputting the images. There may be an area which corresponds to the outputtable area but an area in which an image is not output according to image resolution or lens setting. The processor 114 may identify an area in which an image is not output among the outputtable areas. Here, the processor 114 may control the projection part 111 such that an area in which an image is not output is displayed in black or gray. In addition, the processor 114 may control the projection part 111 such that the color of the non-outputtable area among the outputtable area matches the color of the projection surface. In addition, the processor 114 may control the projection part 111 to output a UI (user setting UI) for the user to directly change the color of the corresponding area.

The electronic apparatus 100 according to an embodiment may display additional information in the remaining area where the first image is not displayed (or output). Therefore, even if the size of the image is reduced through correction, the space may be efficiently used by displaying additional information on the remaining area. Here, the image may be rotated using inclination information to distinguish the first area for outputting the first image including the content from the second area for outputting the additional information.

In addition, in that the processor 114 may control by distinguishing first area and second area, the entire processing process may be simplified or load may be reduced.

In addition, the electronic apparatus 100 may not change the outputtable area notwithstanding rotation of the first image. When the outputtable area is not changed, sharpness of an image may be maintained.

In addition, the electronic apparatus 100 may use inclination information in identifying the remaining region, so additional information may be outputted without distortion.

Figure 2B:
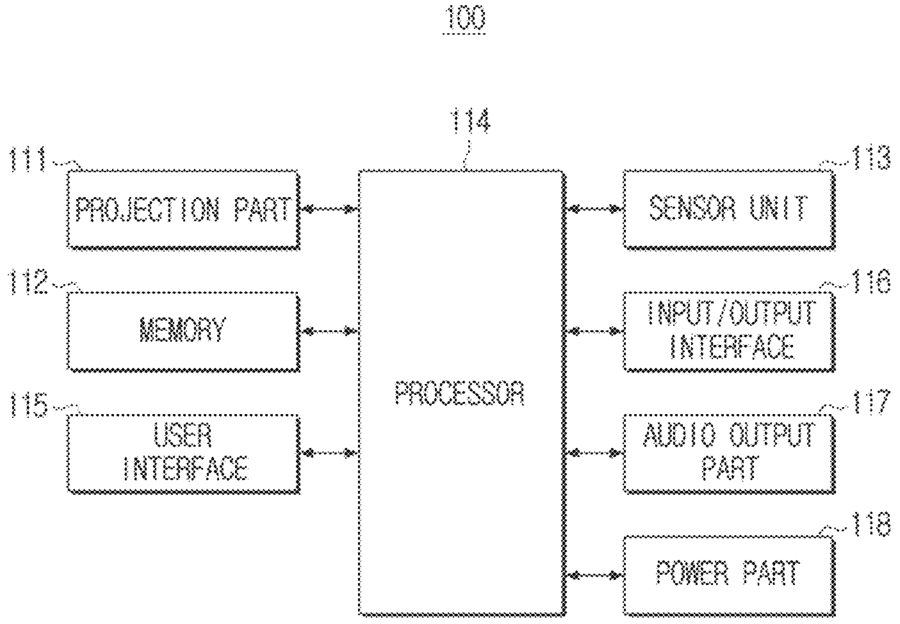
FIG. 2B is a block diagram illustrating a specific configuration of FIG. 2A.

FIG. 2B is a block diagram illustrating a specific configuration of FIG. 2A.

Referring to FIG. 2B, the electronic apparatus 100 may include at least one of the projection part 111, the memory 112, the sensor unit 113, the processor 114, the user interface 115, the input/output interface 116, the audio output part 117, or the power part 118. Here, among the description related to the projection part 111, the memory 112, the sensor unit 113, and the processor 114, the description of the part described in FIG. 2A will be omitted. The configuration illustrated in FIG. 2B is only an embodiment, and some configurations may be omitted, and a new configuration may be added.

The projection part 111 is a component that projects an image to the outside. The projection part 111 according to one or more embodiments of the disclosure may be implemented in various projection methods (e.g., a cathode-ray tube (CRT) method, a liquid crystal display (LCD) method, a digital light processing (DLP) method, a laser method, etc.). As an example, the CRT method has basically the same principle as the principle of a CRT monitor. In the CRT method, an image is enlarged with a lens in front of a cathode-ray tube (CRT), and the image is displayed on a screen. According to the number of cathode-ray tubes, the CRT method is divided into a one-tube method and a three-tube method, and in the case of the three-tube method, it may be implemented while cathode-ray tubes of red, green, and blue are divided separately.

As another example, the LCD method is a method of displaying an image by making a light emitted from a light source pass through a liquid crystal. The LCD method is divided into a single-plate method and a three-plate method, and in the case of the three-plate method, a light emitted from a light source may be separated into red, green, and blue at a dichroic mirror (a mirror that reflects only a light in a specific color and makes the remaining lights pass through), and then pass through a liquid crystal, and then the light may be collected into one place again.

As still another example, the DLP method is a method of displaying an image by using a digital micromirror device (DMD) chip. A projection part by the DLP method may include a light source, a color wheel, a DMD chip, a projection lens, etc. A light emitted from a light source may have a color as it passes through a rotating color wheel. The light that passed through the color wheel is input into a DMD chip. The DMD chip includes numerous micromirrors, and reflects the light input into the DMD chip. A projection lens may perform a role of enlarging the light reflected from the DMD chip to an image size.

As still another example, the laser method includes a diode pumped solid state (DPSS) laser and a galvanometer. As a laser outputting various colors, a laser wherein three DPSS lasers were installed for each of RGB colors, and then the optical axes were overlapped by using a special mirror is used. The galvanometer includes a mirror and a motor of a high output, and moves the mirror at a fast speed. For example, the galvanometer may rotate the mirror at 40 KHz/sec at the maximum. The galvanometer is mounted according to a scanning direction, and in general, a projector performs planar scanning, and thus the galvanometer may also be arranged by being divided into x and y axes.

The projection part 111 may include light sources in various types. For example, the projection part 111 may include at least one light source among a lamp, an LED, and a laser.

Also, the projection part 111 may output images in a 4:3 screen ratio, a 5:4 screen ratio, and a 16:9 wide screen ratio according to the use of the electronic apparatus 100 or a user's setting, etc., and it may output images in various resolutions such as WVGA (854*480), SVGA (800*600), XGA (1024*768), WXGA (1280*720), WXGA (1280*800), SXGA (1280*1024), UXGA (1600*1200), Full HD (1920*1080), etc. according to screen ratios.

The projection part 111 may perform various functions for adjusting an output image by control of the processor 114. For example, the projection part 111 may perform functions such as zoom, keystone, quick corner (4 corner) keystone, lens shift, etc.

Specifically, the projection part 111 may enlarge or reduce an image according to a distance (a projection distance) to the screen. That is, a zoom function may be performed according to a distance to the screen. Here, the zoom function may include a hardware method of adjusting the size of the screen by moving a lens and a software method of adjusting the size of the screen by cropping an image, etc. When the zoom function is performed, adjustment of a focus of an image is needed. For example, methods of adjusting a focus include a manual focus method, an electric method, etc. The manual focus method means a method of manually adjusting a focus, and the electric method means a method wherein the projector automatically adjusts a focus by using a built-in motor when the zoom function is performed. When performing the zoom function, the projection part 111 may provide a digital zoom function through software, and it may also provide an optical zoom function of performing the zoom function by moving a lens through the driving part.

Also, the projection part 111 may perform a keystone function. When the height does not fit in the case of front surface scanning, the screen may be distorted in an upper direction or a lower direction. The keystone function means a function of correcting a distorted screen. For example, if distortion occurs in left and right directions of the screen, the screen may be corrected by using a horizontal keystone, and if distortion occurs in upper and lower directions, the screen may be corrected by using a vertical keystone. The quick corner (4 corner) keystone function is a function of correcting the screen in case the central area of the screen is normal, but the balance of the corner areas is not appropriate. The lens shift function is a function of moving the screen as it is in case the screen is outside the screen area.

The projection part 111 may automatically analyze the surrounding environment and the projection environment without a user input, and perform zoom/keystone/focus functions. Specifically, the projection part 111 may automatically provide zoom/keystone/focus functions based on the distance between the electronic apparatus 100 and the screen, information on the space wherein the electronic apparatus 100 is currently located, information on the light amount in the surroundings, etc. that were sensed through sensors (a depth camera, a distance sensor, an infrared sensor, an illumination sensor, etc.).

Also, the projection part 111 may provide an illumination function by using a light source. In particular, the projection part 111 may provide an illumination function by outputting a light source by using an LED. According to one or more embodiments of the disclosure, the projection part 111 may include an LED, and according to another embodiment of the disclosure, the electronic apparatus may include a plurality of LEDs. The projection part 111 may output a light source by using a surface-emitting LED depending on implementation examples. Here, the surface-emitting LED may mean an LED that has a structure wherein an optical sheet is arranged on the upper side of the LED such that a light source is output while being evenly dispersed. Specifically, when a light source is output through the LED, the light source may be evenly dispersed through the optical sheet, and the light source dispersed through the optical sheet may be introduced into a display panel.

The projection part 111 may provide a dimming function for adjusting the strength of a light source to a user. Specifically, if a user input for adjusting the strength of a light source is received from a user through a user interface 115 (e.g., a touch display button or a dial), the projection part 111 may control the LED to output the strength of a light source corresponding to the received user input.

Also, the projection part 111 may provide the dimming function based on a content analyzed by the processor 114 without a user input. Specifically, the projection part 111 may control the LED to output the strength of a light source based on information on a content that is currently provided (e.g., the type of the content, the brightness of the content, etc.).

The projection part 111 may control a color temperature by control of the processor 114. Here, the processor 114 may control a color temperature based on a content. Specifically, if it is identified that a content is going to be output, the processor 114 may acquire color information for each frame of the content which was determined to be output. Then, the processor 114 may control the color temperature based on the acquired color information for each frame. Here, the processor 114 may acquire at least one main color of the frames based on the color information for each frame. Then, the processor 114 may adjust the color temperature based on the acquired at least one main color. For example, a color temperature that the processor 114 can adjust may be divided into a warm type or a cold type. Here, it is assumed that a frame to be output (referred to as an output frame hereinafter) includes a scene wherein fire occurred. The processor 114 may identify (or acquire) that the main color is red based on color information currently included in the output frame. Then, the processor 114 may identify a color temperature corresponding to the identified main color (red). Here, the color temperature corresponding to red may be a warm type. The processor 114 may use an artificial intelligence model for acquiring color information or a main color of a frame. According to one or more embodiments of the disclosure, the artificial intelligence model may be stored in the electronic apparatus 100 (e.g., the memory 112). According to another embodiment of the disclosure, the artificial intelligence model may be stored in an external server that can communicate with the electronic apparatus 100.

The electronic apparatus 100 may be interlocked with an external device and control the illumination function. Specifically, the electronic apparatus 100 may receive illumination information from an external device. Here, the illumination information may include at least one of brightness information or color temperature information set in the external device. Here, the external device may mean a device connected to the same network as the electronic apparatus 100 (e.g., an IoT device included in the same home/company network) or a device which is not connected to the same network as the electronic apparatus 100, but which can communicate with the electronic apparatus (e.g., a remote control server). For example, it is assumed that an external illumination device included in the same network as the electronic apparatus 100 (an IoT device) is outputting a red illumination at the brightness of 50. The external illumination device (an IoT device) may directly or indirectly transmit illumination information (e.g., information indicating that a red illumination is being output at the brightness of 50) to the electronic apparatus. Here, the electronic apparatus 100 may control the output of a light source based on the illumination information received from the external illumination device. For example, if the illumination information received from the external illumination device includes information that a red illumination is being output at the brightness of 50, the electronic apparatus 100 may output the red illumination at the brightness of 50.

The electronic apparatus 100 may control the illumination function based on bio-information. Specifically, the processor 114 may acquire bio-information of a user. Here, the bio-information may include at least one of the body temperature, the heart rate, the blood pressure, the breath, or the electrocardiogram of the user. Here, the bio-information may include various information other than the aforementioned information. As an example, the electronic apparatus may include a sensor for measuring bio-information. The processor 114 may acquire bio-information of a user through the sensor, and control the output of a light source based on the acquired bio-information. As another example, the processor 114 may receive bio-information from an external device through the input/output interface 116. Here, the external device may mean a portable communication device of a user (e.g., a smartphone or a wearable device). The processor 114 may acquire bio-information of a user from the external device, and control the output of a light source based on the acquired bio-information. Meanwhile, depending on implementation examples, the electronic apparatus may identify whether a user is sleeping, and if it is identified that a user is sleeping (or preparing to sleep), the processor 114 may control the output of a light source based on the bio-information of the user.

The memory 112 may store at least one instruction regarding the electronic apparatus 100. Also, in the memory 112, an operating system (O/S) for driving the electronic apparatus 100 may be stored. In addition, in the memory 112, various software programs or applications for the electronic apparatus 100 to operate according to the various embodiments of the disclosure may be stored. Further, the memory 112 may include a semiconductor memory such as a flash memory or a magnetic storage medium such as a hard disk.

Specifically, in the memory 112, various kinds of software modules for the electronic apparatus 100 to operate according to the various embodiments of the disclosure may be stored, and the processor 114 may control the operations of the electronic apparatus 100 by executing the various kinds of software modules stored in the memory 112. That is, the memory 112 may be accessed by the processor 114, and reading/recording/correcting/deleting/updating, etc. of data by the processor 114 may be performed.

Herein, the term memory 112 may be used as meaning including the memory 112, a ROM (not shown) and a RAM (not shown) inside the processor 114, or a memory card (not shown) installed on the electronic apparatus 100 (e.g., a micro SD card, a memory stick).

The user interface 115 may include input devices in various types. For example, the user interface 115 may include a physical button. Here, the physical button may include a function key, direction keys (e.g., four direction keys), or a dial button. According to one or more embodiments of the disclosure, the physical button may be implemented as a plurality of keys. According to another embodiment of the disclosure, the physical button may be implemented as one key. Here, in case the physical button is implemented as one key, the electronic apparatus 100 may receive a user input by which one key is pushed for equal to or longer than a threshold time. If a user input by which one key is pushed for equal to or longer than a threshold time is received, the processor 114 may perform a function corresponding to the user input. For example, the processor 114 may provide the illumination function based on the user input.

Also, the user interface 115 may receive a user input by using a non-contact method. In the case of receiving a user input through a contact method, physical force should be transmitted to the electronic apparatus. Accordingly, a method for controlling the electronic apparatus regardless of physical force may be needed. Specifically, the user interface 115 may receive a user gesture, and perform an operation corresponding to the received user gesture. Here, the user interface 115 may receive a gesture of a user through a sensor (e.g., an image sensor or an infrared sensor).

In addition, the user interface 115 may receive a user input by using a touch method. For example, the user interface 115 may receive a user input through a touch sensor. According to one or more embodiments of the disclosure, a touch method may be implemented as a non-contact method. For example, the touch sensor may determine whether a user's body approached within a threshold distance. Here, the touch sensor may identify a user input even when a user does not contact the touch sensor. Meanwhile, according to a different implementation example, the touch sensor may identify a user input by which a user contacts the touch sensor.

The electronic apparatus 100 may receive user inputs by various methods other than the aforementioned user interface. As an example, the electronic apparatus 100 may receive a user input through an external remote control device. Here, the external remote control device may be a remote control device corresponding to the electronic apparatus 100 (e.g., a control device dedicated to the electronic apparatus) or a portable communication device of a user (e.g., a smartphone or a wearable device). Here, in the portable communication device of a user, an application for controlling the electronic apparatus may be stored. The portable communication device may acquire a user input through the stored application, and transmit the acquired user input to the electronic apparatus 100. The electronic apparatus 100 may receive the user input from the portable communication device, and perform an operation corresponding to the user's control command.

The electronic apparatus 100 may receive a user input by using voice recognition. According to one or more embodiments of the disclosure, the electronic apparatus 100 may receive a user voice through the microphone included in the electronic apparatus. According to another embodiment of the disclosure, the electronic apparatus 100 may receive a user voice from the microphone or an external device. Specifically, an external device may acquire a user voice through a microphone of the external device, and transmit the acquired user voice to the electronic apparatus 100. The user voice transmitted from the external device may be audio data or digital data converted from audio data (e.g., audio data converted to a frequency domain, etc.). Here, the electronic apparatus 100 may perform an operation corresponding to the received user voice. Specifically, the electronic apparatus 100 may receive audio data corresponding to the user voice through the microphone. Then, the electronic apparatus 100 may convert the received audio data into digital data. Then, the electronic apparatus 100 may convert the converted digital data into text data by using a speech to text (STT) function. According to one or more embodiments of the disclosure, the speech to text (STT) function may be directly performed at the electronic apparatus 100.

According to another embodiment of the disclosure, the speech to text (STT) function may be performed at an external server. The electronic apparatus 100 may transmit digital data to the external server. The external server may convert the digital data into text data, and acquire control command data based on the converted text data. The external server may transmit the control command data (here, the text data may also be included) to the electronic apparatus 100. The electronic apparatus 100 may perform an operation corresponding to the user voice based on the acquired control command data.

The electronic apparatus 100 may provide a voice recognition function by using one assistance (or an artificial intelligence agent, e.g., Bixby™, etc.), but this is merely an example, and the electronic apparatus 100 may provide a voice recognition function through a plurality of assistances. Here, the electronic apparatus 100 may provide the voice recognition function by selecting one of the plurality of assistances based on a trigger word corresponding to the assistance or a specific key that exists on the remote control.

The electronic apparatus 100 may receive a user input by using a screen interaction. The screen interaction may mean a function of the electronic apparatus of identifying whether a predetermined event occurs through an image projected on a screen (or a projection surface), and acquiring a user input based on the predetermined event. Here, the predetermined event may mean an event wherein a predetermined object is identified in a specific location (e.g., a location wherein a UI for receiving a user input was projected). Here, the predetermined object may include at least one of a body part of a user (e.g., a finger), a pointer, or a laser point. If the predetermined object is identified in a location corresponding to the projected UI, the electronic apparatus 100 may identify that a user input selecting the projected UI was received. For example, the electronic apparatus 100 may project a guide image so that the UI is displayed on the screen. Then, the electronic apparatus 100 may identify whether the user selects the projected UI. Specifically, if the predetermined event is identified in the location of the projected UI, the electronic apparatus 100 may identify that the user selected the projected UI. Here, the projected UI may include at least one item. Here, the electronic apparatus 100 may perform spatial analysis for identifying whether the predetermined event is in the location of the projected UI. Here, the electronic apparatus 100 may perform spatial analysis through a sensor (e.g., an image sensor, an infrared sensor, a depth camera, a distance sensor, etc.). By performing spatial analysis, the electronic apparatus 100 may identify whether the predetermined event occurs in the specific location (the location wherein the UI was projected). Then, if it is identified that the predetermined event occurs in the specific location (the location wherein the UI was projected), the electronic apparatus 100 may identify that a user input for selecting the UI corresponding to the specific location was received.

The input/output interface 116 is a component for inputting or outputting at least one of an audio signal or an image signal. The input/output interface 116 may receive input of at least one of an audio signal or an image signal from an external device, and output a control command to the external device.

The input/output interface 116 according to one or more embodiments of the disclosure may be implemented as a wired input/output interface of at least one of a high definition multimedia interface (HDMI), a mobile high-definition link (MHL), a universal serial bus (USB), a USB C-type, a display port (DP), a Thunderbolt, a video graphics array (VGA) port, an RGB port, a Dsubminiature (D-SUB), or a digital visual interface (DVI). According to one or more embodiments of the disclosure, the wired input/output interface may be implemented as an interface inputting or outputting only audio signals and an interface inputting or outputting only image signals, or implemented as one interface inputting or outputting both audio signals and image signals.

Also, the electronic apparatus 100 may receive data through the wired input/output interface, but this is merely an example, and the electronic apparatus 100 may be supplied with power through the wired input/output interface. For example, the electronic apparatus 100 may be supplied with power from an external battery through a USB C-type, or supplied with power from a consent through a power adapter. As another example, the electronic apparatus may be supplied with power from an external device (e.g., a laptop computer or a monitor, etc.) through a DP.

The input/output interface 116 according to one or more embodiments of the disclosure may be implemented as a wireless input/output interface that performs communication by at least one communication method among the communication methods of Wi-Fi, Wi-Fi Direct, Bluetooth, Zigbee, 3rd Generation (3G), 3rd Generation Partnership Project (3GPP), and Long Term Evolution (LTE). Depending on implementation examples, the wireless input/output interface may be implemented as an interface inputting or outputting only audio signals and an interface inputting or outputting only image signals, or implemented as one interface inputting or outputting both audio signals and image signals.

Also, the electronic apparatus 100 may be implemented such that an audio signal is input through a wired input/output interface, and an image signal is input through a wireless input/output interface. Alternatively, the electronic apparatus 100 may be implemented such that an audio signal is input through a wireless input/output interface, and an image signal is input through a wired input/output interface.

The audio output part 117 is a component that outputs audio signals. In particular, the audio output part 117 may include an audio output mixer, an audio signal processor, and an audio output module. The audio output mixer may mix a plurality of audio signals to be output as at least one audio signal. For example, the audio output mixer may mix an analog audio signal and another analog audio signal (e.g.: an analog audio signal received from the outside) as at least one analog audio signal. The audio output module may include a speaker or an output terminal. According to one or more embodiments of the disclosure, the audio output module may include a plurality of speakers, and in this case, the audio output module may be arranged inside the main body, and audio that is emitted while covering at least a part of a vibration plate of the audio output module may be transmitted to the outside of the main body after passing through a waveguide. The audio output module may include a plurality of audio output parts, and the plurality of audio output parts may be symmetrically arranged on the exterior of the main body, and accordingly, audio may be emitted to all directions, i.e., all directions in 360 degrees.

The power part 118 may be supplied with power from the outside and supply the power to various components of the electronic apparatus 100. The power part 118 according to one or more embodiments of the disclosure may be supplied with power through various methods. As an example, the power part 118 may be supplied with power by using the connector 130 as illustrated in FIG. 1. Also, the power part 118 may be supplied with power by using a DC power code of 220V. However, the disclosure is not limited thereto, and the electronic apparatus may be supplied with power by using a USB power code or supplied with power by using a wireless charging method.

Also, the power part 118 may be supplied with power by using an internal battery or an external battery. The power part 118 according to one or more embodiments of the disclosure may be supplied with power through an internal battery. As an example, the power part 118 may charge power of the internal battery by using at least one of a DC power code of 220V, a USB power code, or a USB C-type power code, and may be supplied with power through the charged internal battery. Also, the power part 118 according to one or more embodiments of the disclosure may be supplied with power through an external battery. As an example, if connection between the electronic apparatus and an external battery is performed through various wired communication methods such as a USB power code, a USB C-type power code, a socket groove, etc., the power part 118 may be supplied with power through the external battery. That is, the power part 118 may be directly supplied with power from an external battery, or charge an internal battery through an external battery, and supplied with power from the charged internal battery.

The power part 118 according to the disclosure may be supplied with power by using at least one of the aforementioned plurality of power supplying methods.

Meanwhile, regarding power consumption, the electronic apparatus 100 may have power consumption of equal to or smaller than a predetermined value (e.g., 43 W) for the reason of a form of a socket or other standards, etc. Here, the electronic apparatus 100 may vary the power consumption such that the power consumption may be reduced when using a battery. That is, the electronic apparatus 100 may vary the power consumption based on the power supplying method and the use amount of power, etc.

The electronic apparatus 100 according to one or more embodiments of the disclosure may provide various smart functions.

Specifically, the electronic apparatus 100 may be connected with a portable terminal device for controlling the electronic apparatus 100, and the screen output at the electronic apparatus 100 may be controlled through a user input that is input at the portable terminal device. As an example, the portable terminal device may be implemented as a smartphone including a touch display, and the electronic apparatus 100 may receive screen data provided at the portable terminal device from the portable terminal device and output the data, and the screen output at the electronic apparatus 100 may be controlled according to a user input that is input at the portable terminal device.

The electronic apparatus 100 may perform connection with the portable terminal device through various communication methods such as Miracast, Airplay, wireless DEX, a remote PC method, etc., and share contents or music provided at the portable terminal device.

Also, connection between the portable terminal device and the electronic apparatus 100 may be performed by various connection methods. As an example, the electronic apparatus 100 may be searched at the portable terminal device and wireless connection may be performed, or the portable terminal device may be searched at the electronic apparatus 100 and wireless connection may be performed. Then, the electronic apparatus 100 may output contents provided at the portable terminal device.

As an example, in a state wherein a specific content or music is being output at the portable terminal device, if the portable terminal device is located around the electronic apparatus, and then a predetermined gesture (e.g., a motion tap view) is detected through a display of the portable terminal device, the electronic apparatus 100 may output the content or music that is being output at the portable terminal device.

As an example, in a state wherein a specific content or music is being output at the portable terminal device, if the portable terminal device becomes close to the electronic apparatus 100 by equal to or smaller than a predetermined distance (e.g., a non-contact tap view), or the portable terminal device contacts the electronic apparatus 100 two times at a short interval (e.g., a contact tap view), the electronic apparatus 100 may output the content or music that is being output at the portable terminal device.

In the aforementioned embodiment, it was described that the same screen as the screen that is being provided at the portable terminal device is provided at the electronic apparatus 100, but the disclosure is not limited thereto. That is, if connection between the portable terminal device and the electronic apparatus 100 is constructed, a first screen provided at the portable terminal device may be output at the portable terminal device, and a second screen provided at the portable terminal device that is different from the first screen may be output at the electronic apparatus 100. As an example, the first screen may be a screen provided by a first application installed on the portable terminal device, and the second screen may be a screen provided by a second application installed on the portable terminal device. As an example, the first screen and the second screen may be different screens from each other that are provided by one application installed on the portable terminal device. Also, as an example, the first screen may be a screen including a UI in a remote control form for controlling the second screen.

The electronic apparatus 100 according to the disclosure may output a standby screen. As an example, in case connection between the electronic apparatus 100 and an external device was not performed or in case there is no input received from an external device during a predetermined time, the electronic apparatus 100 may output a standby screen. Conditions for the electronic apparatus 100 to output a standby screen are not limited to the aforementioned example, and a standby screen may be output by various conditions.

The electronic apparatus 100 may output a standby screen in the form of a blue screen, but the disclosure is not limited thereto. As an example, the electronic apparatus 100 may extract only a shape of a specific object from data received from an external device and acquire an atypical object, and output a standby screen including the acquired atypical object.

Figure 3:
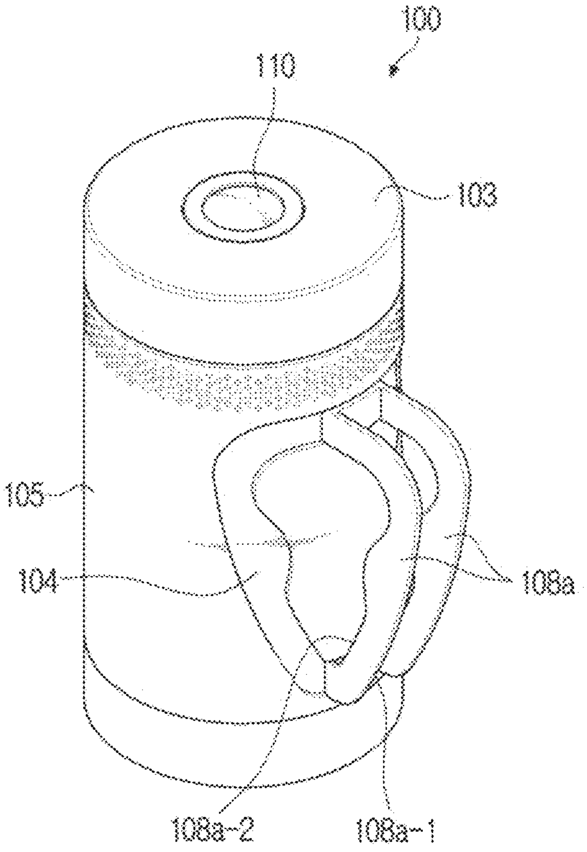
FIG. 3 is a perspective view illustrating an external appearance of the electronic apparatus, according to one or more embodiments of the disclosure.

FIG. 3 is a perspective view illustrating the exterior of the electronic apparatus 100 according to other embodiments of the disclosure.

Referring to FIG. 3, the electronic apparatus 100 may include a support (or, it may be referred to as "a handle") 108*a*.

The support 108*a* according to the various embodiments of the disclosure may be a handle or a ring that is provided for a user to grip or move the electronic apparatus 100. Alternatively, the support 108*a* may be a stand that supports the main body 105 while the main body 105 is laid down in the direction of the side surface.

The support 108*a* may be connected in a hinge structure such that it is coupled to or separated from the outer circumferential surface of the main body 105 as illustrated in FIG. 3, and it may be selectively separated from or fixed to the outer circumferential surface of the main body 105 according to a user's need. The number, shape, or arrangement structure of the support 108*a* may be implemented in various ways without restriction. Although not illustrated in the drawings, the support 108*a* may be housed inside the main body 105, and it may be taken out and used by a user depending on needs. Alternatively, the support 108*a* may be implemented as a separate accessory, and it may be attached to or detached from the electronic apparatus 100.

The support 108*a* may include a first support surface 108*a*-1 and a second support surface 108*a*-2. The first support surface 108*a*-1 may be a surface that faces the outer direction of the main body 105 while the support 108*a* is separated from the outer circumferential surface of the main body 105, and the second support surface 108*a*-2 may be a surface that faces the inner direction of the main body 105 while the support 108*a* is separated from the outer circumferential surface of the main body 105.

The first support surface 108*a*-1 may proceed toward the upper part of the main body 105 from the lower part of the main body 105 and get far from the main body 105, and the first support surface 108*a*-1 may have a shape that is flat or uniformly curved. In case the electronic apparatus 100 is held such that the outer side surface of the main body 105 contacts the bottom surface, i.e., in case the electronic apparatus 100 is arranged such that the projection lens 110 is toward the front surface direction, the first support surface 108*a*-1 may support the main body 105. In an embodiment including two or more supports 108*a*, the emission angle of the head 103 and the projection lens 110 may be adjusted by adjusting the interval or the hinge opening angle of the two supports 108*a*.

The second support surface 108*a*-2 is a surface that contacts a user or an external holding structure when the support 108*a* is supported by the user or the external holding structure, and it may have a shape corresponding to the gripping structure of the user's hand or the external holding structure such that the electronic apparatus 100 does not slip in case the electronic apparatus 100 is supported or moved. The user may make the projection lens 110 face toward the front surface direction, and fix the head 103 and hold the support 108*a*, and move the electronic apparatus 100, and use the electronic apparatus 100 like a flashlight.

The support groove 104 is a groove structure that is provided on the main body 105 and wherein the support 108*a* may be accommodated when it is not used, and as illustrated in FIG. 3, the support groove 104 may be implemented as a groove structure corresponding to the shape of the support 108*a* on the outer circumferential surface of the main body 105. Through the support groove 104, the support 108*a* may be kept on the outer circumferential surface of the main body 105 when the support 108*a* is not used, and the outer circumferential surface of the main body 105 may be maintained to be slick.

Alternatively, in a situation wherein the support 108*a* is kept inside the main body 105 and the support 108*a* is needed, the electronic apparatus 100 may have a structure wherein the support 108*a* is taken out to the outside of the main body 105. In this case, the support groove 104 may be a structure that is led into the inside of the main body 105 so as to accommodate the support 108*a*, and the second support surface 108*a*-2 may include a door (not shown) that adheres to the outer circumferential surface of the main body 105 or opens or closes the separate support groove 104.

Although not illustrated in the drawings, the electronic apparatus 100 may include various kinds of accessories that are helpful in using or keeping the electronic apparatus 100. For example, the electronic apparatus 100 may include a protection case (not shown) such that the electronic apparatus 100 may be easily carried while being protected. Alternatively, the electronic apparatus 100 may include a tripod (not shown) that supports or fixes the main body 105, and a bracket (not shown) that may be coupled to an outer surface and fix the electronic apparatus 100.

Figure 4A:
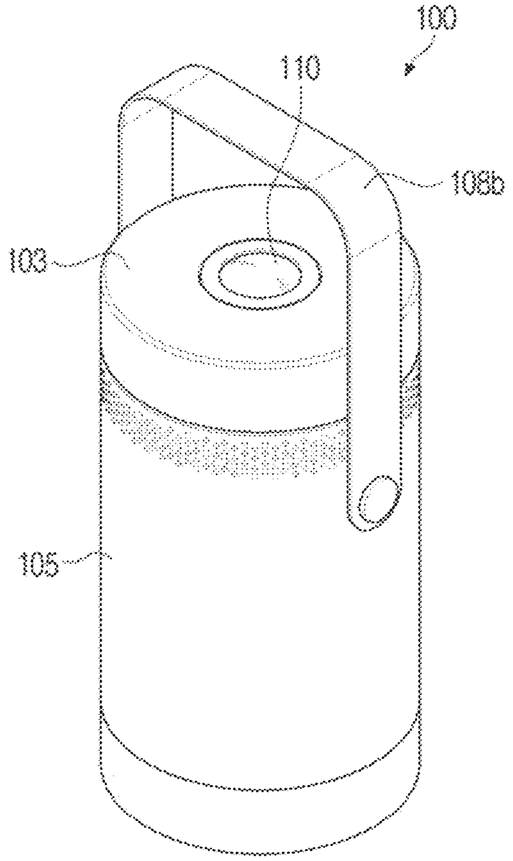
FIG. 4A is a perspective view illustrating an exterior of the electronic apparatus, according to one or more embodiments of the disclosure.

FIG. 4*a* is a perspective view illustrating the exterior of the electronic apparatus 100 according to still other embodiments of the disclosure.

Referring to FIG. 4*a*, the electronic apparatus 100 may include a support (or, it may be referred to as "a handle") 108*b*.

The support 108*b* according to the various embodiments of the disclosure may be a handle or a ring that is provided for a user to grip or move the electronic apparatus 100. Alternatively, the support 108*b* may be a stand that supports the main body 105 so that the main body 105 may be toward a random angle while the main body 105 is laid down in the direction of the side surface.

Specifically, as illustrated in FIG. 4, the support 108*b* may be connected with the main body 105 at a predetermined point (e.g., a ⅔-¾ point of the height of the main body) of the main body 105. When the support 108*b* is rotated in the direction of the main body, the main body 105 may be supported such that the main body 105 may be toward a random angle while the main body 105 is laid down in the direction of the side surface.

Figure 4B:
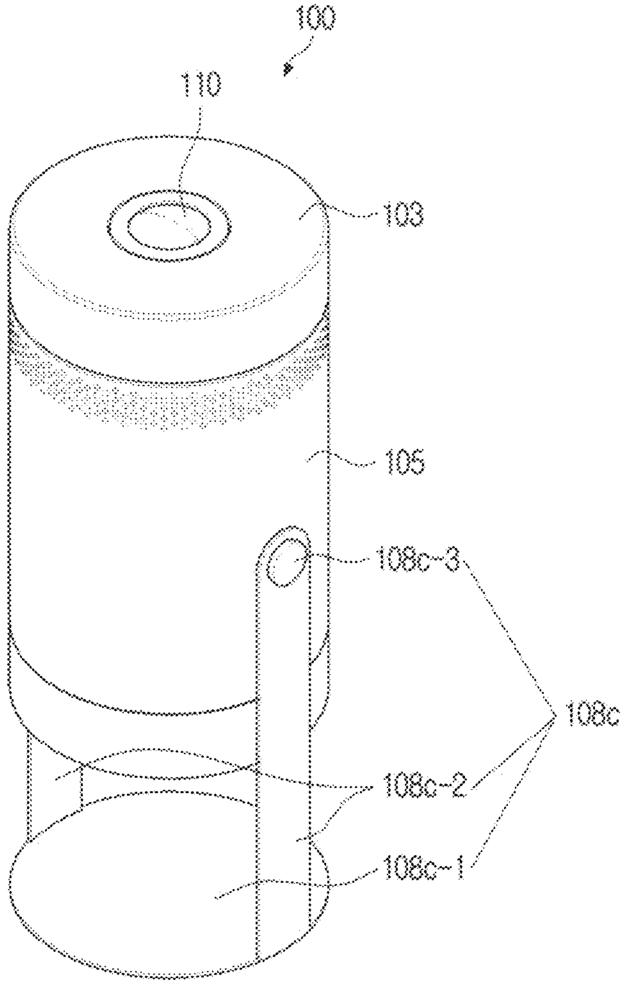
FIG. 4B is a perspective view illustrating an external appearance of the electronic apparatus, according to one or more embodiments of the disclosure.

FIG. 4*b* is a perspective view illustrating the exterior of the electronic apparatus 100 according to still other embodiments of the disclosure.

Referring to FIG. 4*b*, the electronic apparatus 100 may include a support (or, it may be referred to as "a prop") 108*c*. The support 108*c* according to the various embodiments of the disclosure may include a base plate 108*c*-1 that is provided to support the electronic apparatus 100 on the ground and two support members 108*c*-2 connecting the base plate 108*c*-1 and the main body 105.

According to one or more embodiments of the disclosure, the heights of the two support members 108*c*-2 are identical, and thus each one cross section of the two support members 108*c*-2 may be coupled or separated by a groove and a hinge member 108*c*-3 provided on one outer circumferential surface of the main body 105.

The two support members may be hinge-coupled to the main body 105 at a predetermined point (e.g., a ⅓-²⁄₄ point of the height of the main body) of the main body 105.

When the two support members and the main body are coupled by the hinge member 108*c*-3, the main body 105 is rotated based on a virtual horizontal axis formed by the two hinge members 108*c*-3, and accordingly, the emission angle of the projection lens 110 may be adjusted.

Figure 4C:
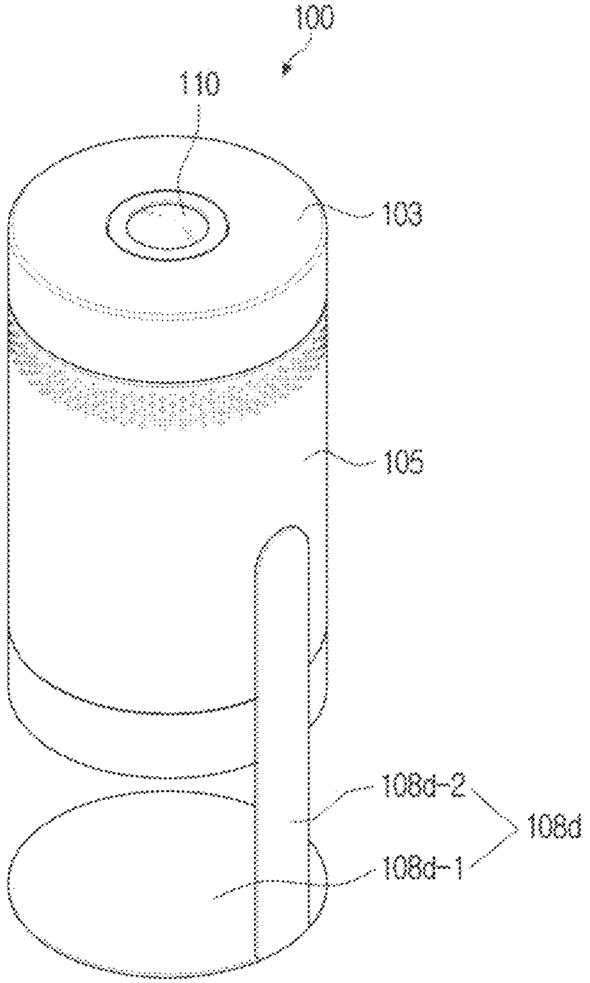
FIG. 4C is a perspective view illustrating an external appearance of the electronic apparatus, according to one or more embodiments of the disclosure.
Figure 4D:
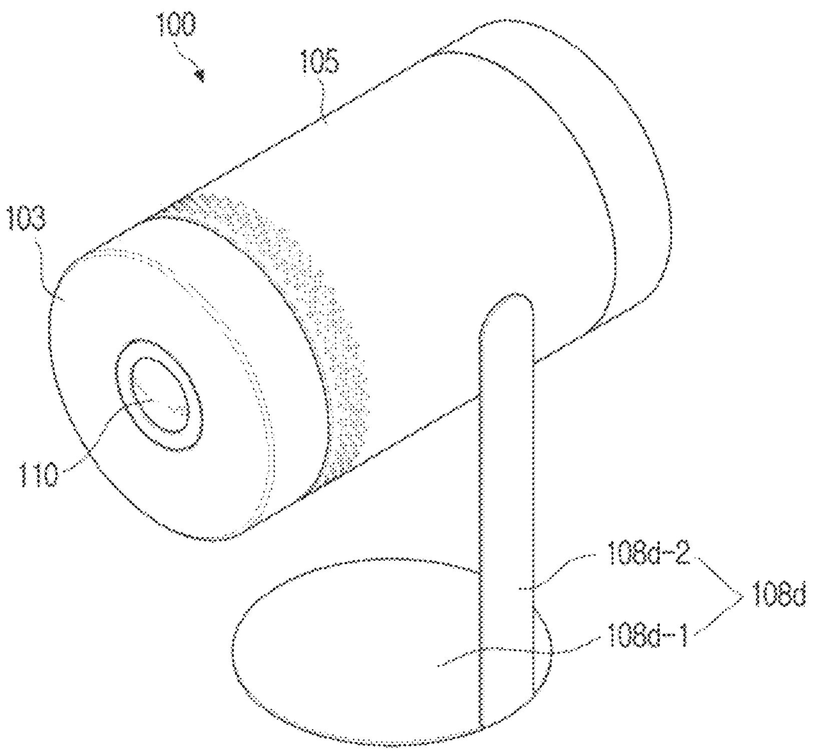
FIG. 4D is a perspective view illustrating a state in which the electronic apparatus 100 of FIG. 4C is rotated, according to one or more embodiments.

FIG. 4*b* illustrates an embodiment wherein the two support members 108*c*-2 are connected with the main body 105, but the disclosure is not limited thereto, and as in FIG. 4*c* and FIG. 4*d*, one support member and the main body 105 may be connected by one hinge member.

FIG. 4*c* is a perspective view illustrating the exterior of the electronic apparatus 100 according to still other embodiments of the disclosure.

FIG. 4*d* is a perspective view illustrating a state wherein the electronic apparatus 100 in FIG. 4*c* is rotated.

Referring to FIG. 4*c* and FIG. 4*d*, the support 108*d* according to the various embodiments of the disclosure may include a base plate 108*d*-1 that is provided to support the electronic apparatus 100 on the ground and one support member 108*d*-2 connecting the base plate 108*d*-1 and the main body 105.

Also, the cross section of the one support member 108*d*-2 may be coupled or separated by a groove and a hinge member (not shown) provided on one outer circumferential surface of the main body 105.

When the one support member 108*d*-2 and the main body 105 are coupled by one hinge member (not shown), the main body 105 may be rotated based on a virtual horizontal axis formed by the one hinge member (not shown), as in FIG. 4*d*.

The supports illustrated in FIGS. 3, 4*a*, 4*b*, 4*c*, and 4*d* are merely examples, and the electronic apparatus 100 can obviously include supports in various locations or forms.

Figure 5:
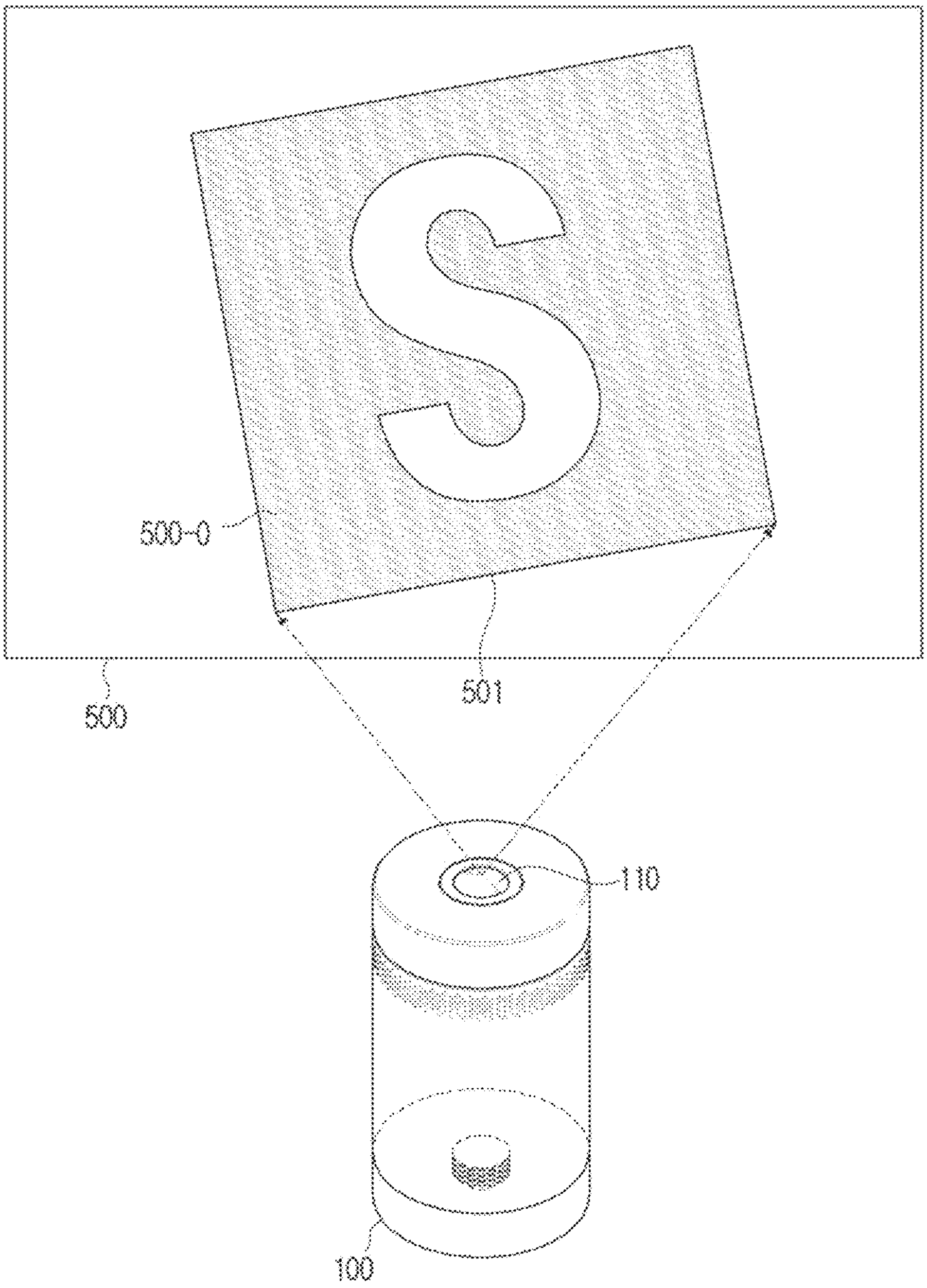
FIG. 5 is a diagram illustrating an operation of outputting an image to a projection surface, according to one or more embodiments.

FIG. 5 is a diagram illustrating an operation of outputting an image to a projection surface.

Referring to FIG. 5, the electronic apparatus 100 may output a first image 501 on a projection surface 500 through the projection part 111. The electronic apparatus 100 may output the first image 501 on an outputtable area 500-0 among the entire areas of the projection surface 500.

Here, the projection surface 500 may refer to the entire area of the physical space in which the electronic apparatus 100 may output an image. Here, the projection surface 500 may include at least one surface. For example, the projection surface 500 may be formed of one plane. As another example, the projection surface 500 may include at least two or more surfaces, and a boundary between the surface and the surface may exist.

Here, the outputtable area 500-0 may refer to an area in which an image is likely to be output by the electronic apparatus 100 among the entire area of the projection surface 500. The electronic apparatus 100 may be controlled such that the size of the image is output differently according to the output setting of the projection part 111. For example, the electronic apparatus 100 may enlarge and output the image even though the sharpness of the image is low. Conversely, the electronic apparatus 100 may output the image by reducing the size of the image although the sharpness of the image is high.

According to one or more embodiments, the outputtable area 500-0 may mean an area in which the image is enlarged to a maximum size physically for outputting.

According to another embodiment, the outputtable area 500-0 may refer to an area by maximally enlarging the size of the image and outputting the image while maintaining the sharpness of the image within a predetermined range. If the size of the image is too enlarged, the sharpness may be reduced, so the electronic apparatus 100 may restrict enlarging the image to be large in consideration of the sharpness of the image. Accordingly, the electronic apparatus 100 may limit the size of the outputtable area 500-0 in consideration of the sharpness of the image. Here, the outputtable area 500-0 may be determined based on at least one of physical characteristic information (e.g. lens magnification), size of the projection surface 500, distance to the projection surface 500, or resolution information of the image.

The first image 501 output on the projection surface 500 may be displayed in an inclined state. When the electronic apparatus 100 is inclined, the first image 501 may also be output in an inclined state. Accordingly, the electronic apparatus 100 needs to correct (or change) and output the first image 501. To correct the first image 501, the electronic apparatus 100 may obtain inclination information of the electronic apparatus 100.

Figure 6:
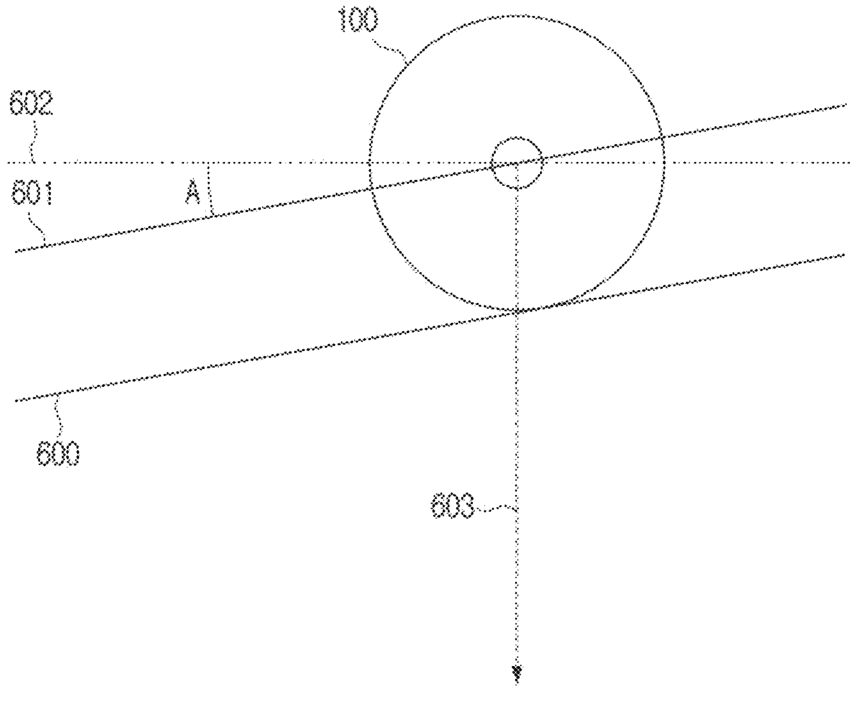
FIG. 6 is a diagram illustrating an operation of obtaining inclination information, according to one or more embodiments.

FIG. 6 is a diagram illustrating an operation of obtaining inclination information according to one or more embodiments.

Referring to FIG. 6, the electronic apparatus 100 may sense inclination information of the electronic apparatus 100. Here, the electronic apparatus 100 may obtain sensing data related to the inclination through the sensor unit 113, and obtain the inclination information of the electronic apparatus 100 based on the obtained sensing data. Here, the sensor unit 113 may include an inclination sensor.

Here, the inclination sensor for sensing inclination may include an acceleration sensor or a gyro sensor. The acceleration sensor or gyro sensor may obtain sensing data indicating at which degree the electronic apparatus 100 is inclined.

Specifically, it is assumed that the electronic apparatus 100 is located on the bottom surface 600. The electronic apparatus 100 may identify the horizontal surface 601 of the electronic apparatus 100 parallel to the bottom surface 600 by using sensor unit 113. The electronic apparatus 100 may identify an absolute horizontal plane 602. Here, the absolute horizontal plane 602 may mean a plane perpendicular to the gravitational acceleration direction 603 of the object regardless of the inclination of the electronic apparatus 100.

Here, the electronic apparatus 100 may identify an angle A between a horizontal surface 601 of the electronic apparatus 100 and an angle A of the absolute horizontal surface 602. The electronic apparatus 100 may obtain identified angle (A) as the incline information of the electronic apparatus 100.

Figure 7:
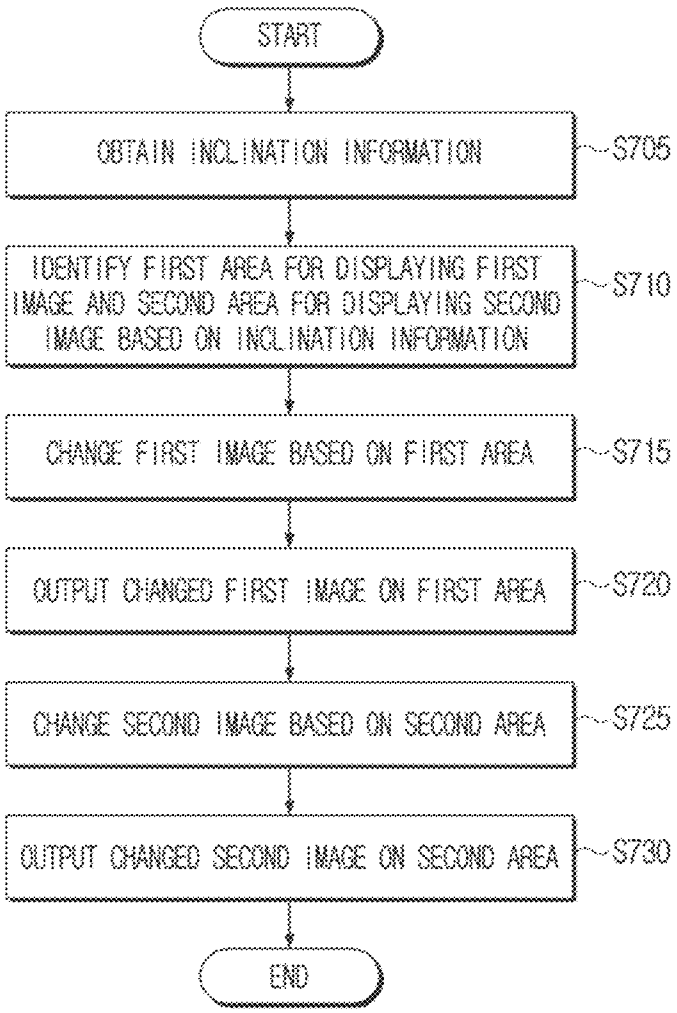
FIG. 7 is a flowchart illustrating an operation of outputting a first image and a second image to different areas, according to one or more embodiments.

FIG. 7 is a flowchart illustrating an operation of outputting a first image and a second image to different areas.

Referring to FIG. 7, the electronic apparatus 100 may obtain inclination information through the inclination sensor in operation S705. The description related thereto has been provided in FIG. 6.

In addition, the electronic apparatus 100 may identify the first area for displaying (or outputting) the first image and the second area for displaying (or outputting) the second image based on the inclination information in operation S710.

Here, the electronic apparatus 100 may change (or correct) the first image based on the first area in operation S715. Specifically, the electronic apparatus 100 may rotate the first image and change the size of the first image based on the size of the first area. The image change operation may include at least one of an operation of rotating the image or an operation of changing the size of the image. In addition, the electronic apparatus 100 may output changed first image on the projection surface in operation S720.

Here, the electronic apparatus 100 may change (or correct) the second image based on the second area in operation S725. Specifically, the electronic apparatus 100 may rotate and change the size of the second image based on the size of the second area. The operation of changing the image may include at least one of an operation of rotating the image or an operation of changing the size of the image. The electronic apparatus 100 may output the changed second image on the projection surface in operation S730.

Figure 8:
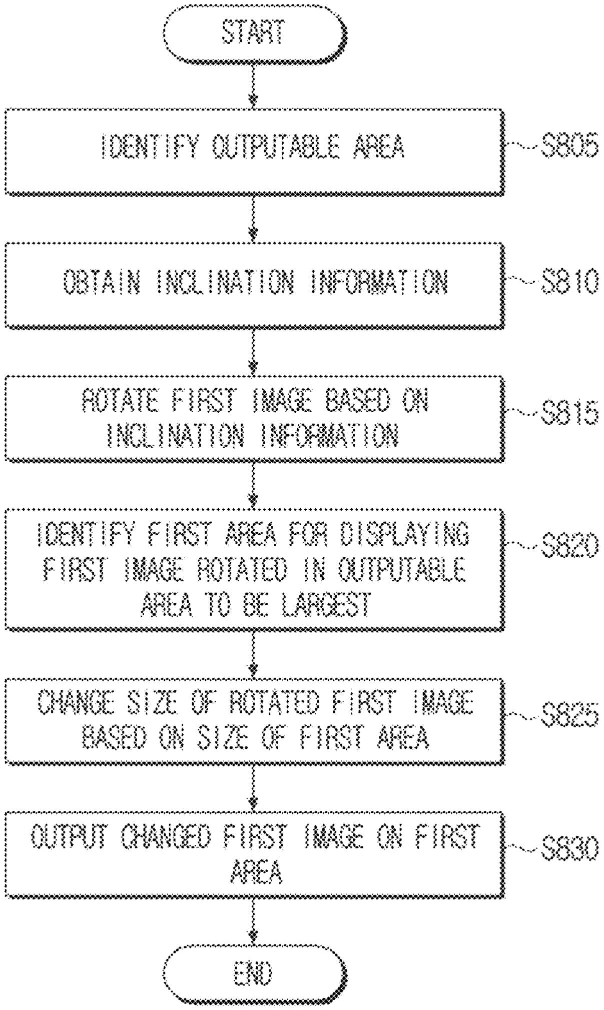
FIG. 8 is a flowchart illustrating an operation of changing a first image, according to one or more embodiments.

FIG. 8 is a flowchart illustrating an operation of changing a first image.

Referring to FIG. 8, the electronic apparatus 100 may identify an outputtable area in operation S805. Here, the outputtable area may mean an area in which an image output through the projection part 111 included in the electronic apparatus 100 may be output. Accordingly, the outputtable area may vary according to the physical characteristics of the projection part 111. For example, the size of the output area may be different according to the magnification information of the projection part 111.

Even if an image is outputted, the size of the image may be excessively enlarged, and the sharpness of the image may be lowered. Here, if the sharpness of the image falls, an outputtable area from which the image is output may be meaningless. Therefore, in consideration of the physical characteristics of the projection part 111, the electronic apparatus 100 may identify an outputtable area so that the sharpness of the image may be outputted within a threshold range.

Here, the electronic apparatus 100 may include the inclination information in operation S810. The description related to the inclination information has been provided in relation to FIG. 6.

The electronic apparatus 100 may rotate the first image based on the obtained inclination information in operation S815. Specifically, the electronic apparatus 100 may rotate the first image so that the first image is displayed not to be inclined. For example, when the electronic apparatus 100 is inclined counterclockwise by 5 degrees with respect to the projection surface, the electronic apparatus 100 may rotate the first image clockwise by 5 degrees with respect to the projection surface.

Then, the electronic apparatus 100 may identify a first area for displaying the first image rotated in the outputtable area to be the largest in operation S820. Even if the first image is rotated, the electronic apparatus 100 may not be rotated. Accordingly, the outputtable area may still be fixed. If the first image is rotated without changing the size, the first image may not be output in the outputtable area. Therefore, the electronic apparatus 100 may need to change and output the size of the image. Here, the electronic apparatus 100 may identify the area in which the rotated first image may be displayed to be largest in the outputtable area as the first area.

The electronic apparatus 100 may change the first image based on the identified first area. Specifically, the electronic apparatus 100 may change the size of the first image rotated based on the size of the first area. For example, when the first image is a rectangular image, the electronic apparatus 100 may change the width and the length of the first image rotated based on the width and the height of the identified first area. As another example, when the first image is a circular image, the electronic apparatus 100 may change the radius of the first image rotated based on the identified radius of the first area.

In addition, the electronic apparatus 100 may output the changed first image in operation S830. Here, the changed first image may mean an image for which a rotation operation and the size changing operation are performed.

Figure 9:
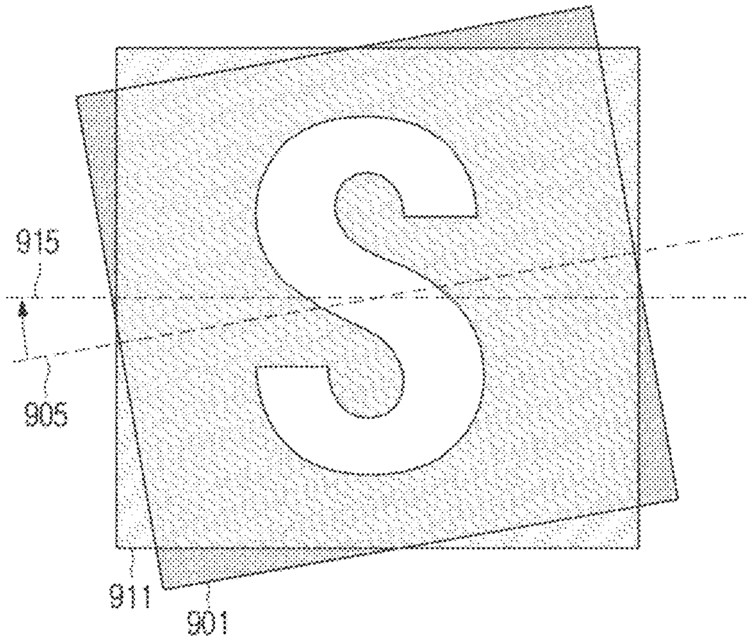
FIG. 9 is a diagram illustrating an operation of rotating a first image, according to an embodiment.

FIG. 9 is a diagram illustrating an operation of rotating a first image.

Referring to FIG. 9, it is assumed that the electronic apparatus 100 is inclined by five degrees in the counterclockwise direction based on the direction facing the projection surface.

Here, when the first image 901 is output without rotation, the electronic apparatus 100 may output first image 901 by being inclined by five degrees counterclockwise in the direction of seeing the projection surface.

Here, the electronic apparatus 100 may rotate the first image 901 based on the inclination information. The inclination information may include the inclination direction and the inclination angle. Here, the electronic apparatus 100 may rotate the first image 901 by inclination angle (five degrees) in the clockwise direction based on the direction facing the projection surface which is the opposite direction of the inclination direction (counterclockwise direction with respect to the direction facing the projection surface).

Here, the electronic apparatus 100 may output a rotated first image 911. Here, the angle between a horizontal surface 905 of the first image 901 output before rotation and a horizontal surface 915 of the first image 911 output after rotation may be five degrees.

Figure 10:
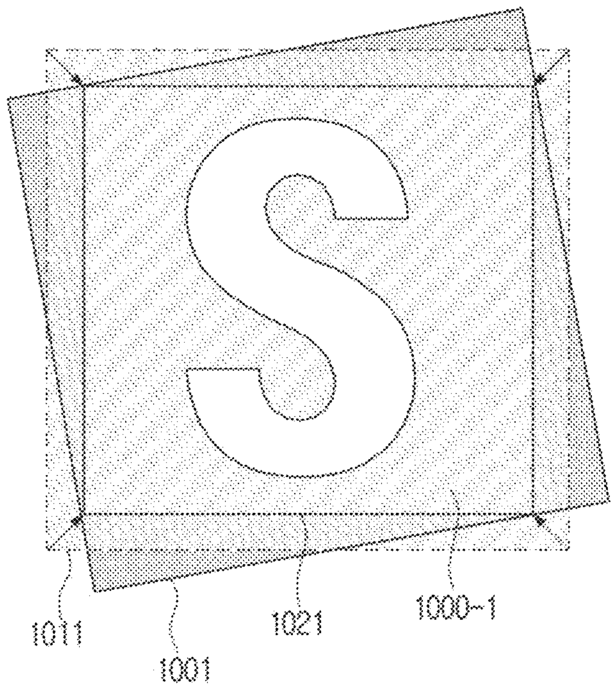
FIG. 10 is a diagram illustrating an operation of changing a size of a rotated first image, according to one or more embodiments.

FIG. 10 is a diagram illustrating an operation of changing a size of a rotated first image.

Referring to FIG. 10, the electronic apparatus 100 may perform an operation of changing the size of the image after performing the image rotation operation. Specifically, the electronic apparatus 100 may rotate the first image 1001 based on the inclination information. The electronic apparatus 100 may obtain the rotated first image 1011. The electronic apparatus 100 may change the size of the rotated first image 1011 so that the rotated first image 1011 may be displayed as large as possible in the outputtable area. Here, the electronic apparatus 100 may change the size of the rotated first image 1011 while maintaining the width to height ratio.

Here, the electronic apparatus 100 may identify a first area 1000-1 in which the rotated first image 1011 may be displayed as large as possible in the outputtable area. The electronic apparatus 100 may change the size of the rotated first image 1011 based on the identified first area 1000-1.

Here, the electronic apparatus 100 may obtain the changed first image 1021 by changing the size of the rotated first image 1011. In addition, the electronic apparatus 100 may output the changed first image 1021 to the first area 1000-1.

Figure 11:
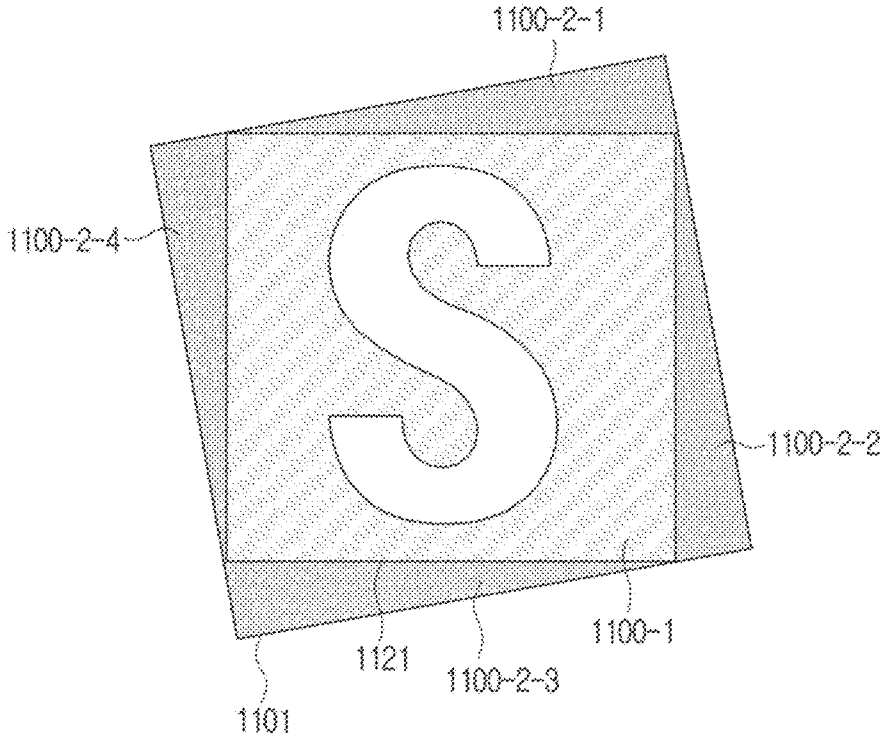
FIG. 11 is a view illustrating the second area, according to one or more embodiments.

FIG. 11 is a view illustrating the second area.

Referring to FIG. 11, the electronic apparatus 100 may change a first image 1101 so that the first image 1101 may be output horizontally. The changed first image 1121 may be displayed on the first area 1100-1. Here, the operation of identifying the first area has been described in FIG. 10.

The electronic apparatus 100 may identify a second area (1100-2-1, 1100-2-2, 1100-2-3, 1100-2-4) excluding the first area 1100-1 from the outputtable area. Here, a plurality of second areas 1100-2-1, 1100-2-2, 1100-2-3, 1100-2-4) may be provided. According to another embodiment, the second area may be composed of one area.

Here, the second area may mean an area in which the changed image 1121 is not output among the outputtable area.

Figure 12:
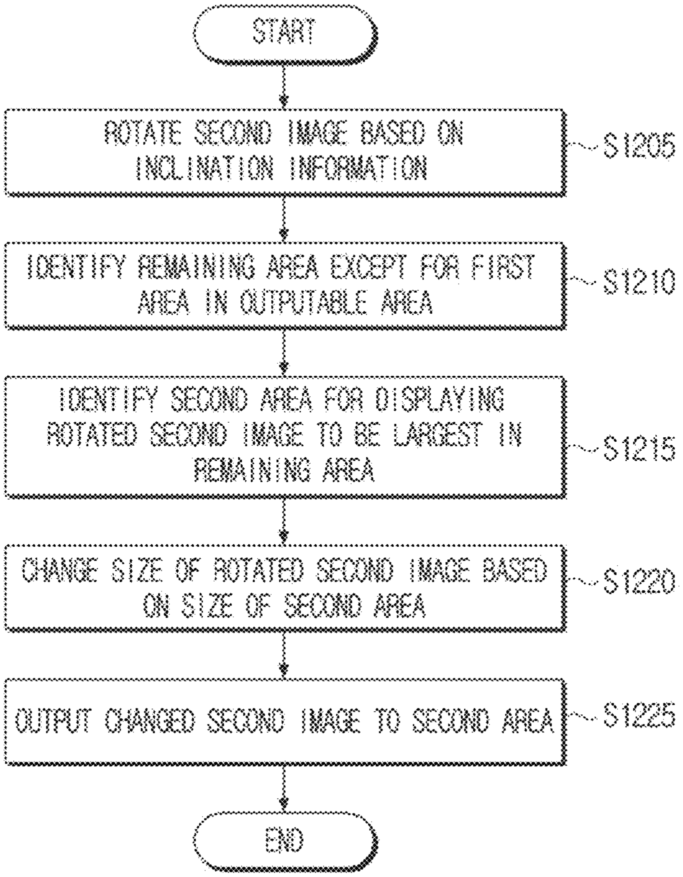
FIG. 12 is a flowchart illustrating an operation of changing a second image, according to one or more embodiments.

FIG. 12 is a flowchart illustrating an operation of changing a second image.

Referring to FIG. 12, the electronic apparatus 100 may rotate the second image based on the inclination information in operation S1205. When the electronic apparatus 100 is inclined, like the first image, the second image may be output in an inclined state. Therefore, the electronic apparatus 100 may need to rotate the second image.

Specifically, the electronic apparatus 100 may identify the remaining area except for the first area in the outputtable area in operation S1210. The electronic apparatus 100 may identify a second area for displaying the rotated second image to be the largest in the remaining area in operation S1215. The electronic apparatus 100 needs to determine where to display the second image among areas other than the first area for displaying the first image. The electronic apparatus 100 may identify the second area for displaying the second image as the largest among the remaining areas as much as possible.

The electronic apparatus 100 may change the size of the rotated second image based on the size of the second area in operation S1220. For example, when the second image has a rectangular shape, the electronic apparatus 100 may change the width and height of the second image based on the width and height of the second area. As another example, if the second image has a circular shape, the electronic apparatus 100 may change the radius of the second image based on the radius of the second area.

The electronic apparatus 100 may output the changed second image to the second area in operation S1225. Here, the changed second image may be an image in which both a rotation operation and a size change operation are performed. Accordingly, even though the size of the output second image is smaller than that of the second image before being changed, the output second image may be displayed as large as possible out of the remaining areas.

Figure 13:
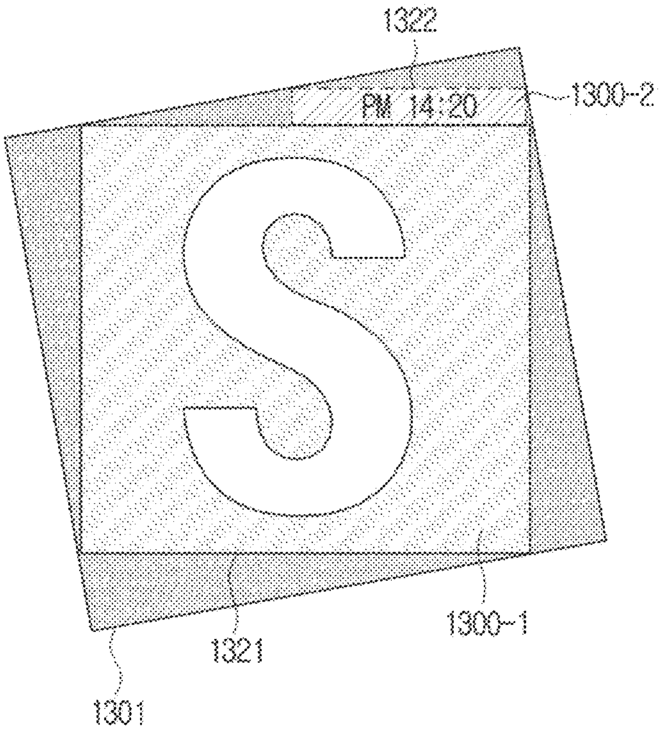
FIG. 13 is a diagram illustrating an operation of outputting a second image, according to one or more embodiments.

FIG. 13 is a diagram illustrating an operation of outputting a second image according to one or more embodiments.

Referring to FIG. 13, the electronic apparatus 100 may change a first image 1301 and may obtain a changed first image 1321. The electronic apparatus 100 may output the changed first image 1321 to a first area 1300-1.

In addition, the electronic apparatus 100 may obtain the changed second image 1322 by changing the second image. In addition, the electronic apparatus 100 may output the changed second image 1322 to the second area 1300-2. Here, the second area 1300-2 may refer to an area capable of displaying a second image among remaining areas except for an area in which the first image is displayed.

A first image 1321 may be displayed in the first area 1300-1, and a first image may not be displayed in the remaining area. Therefore, the electronic apparatus 100 may display additional information by using the remaining area. In an embodiment of FIG. 13, the electronic apparatus 100 may output a second image 1322 to a second area 1300-2 capable of displaying additional information as large as possible in the remaining area.

Figure 14:
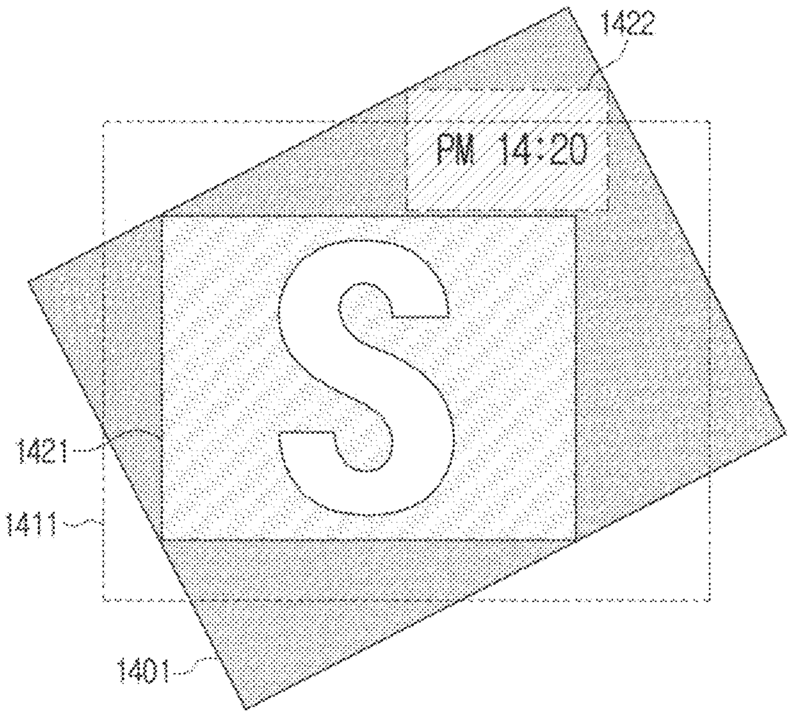
FIG. 14 is a diagram illustrating an operation of outputting a second image, according to one or more embodiments.

FIG. 14 is a diagram illustrating an operation of outputting a second image, according to another embodiment.

Referring to FIG. 14, the electronic apparatus 100 may obtain the rotated first image 1411 by rotating the first image 1401 based on inclination information. The electronic apparatus 100 may identify a first area in which the rotated first image 1411 is displayed largest in the outputtable area. Here, the electronic apparatus 100 may identify the first area based on the size of the rotated first image 1411. Specifically, the electronic apparatus 100 may identify the first area while maintaining the size ratio of the rotated first image 1411.

Since the rotated first image 1411 is beyond the outputtable area, the electronic apparatus 100 may reduce the size of the rotated first image 1411. Here, the electronic apparatus 100 may identify a first area in which the rotated first image 1411 may be output to a maximum size while maintaining a size ratio of the rotated first image 1411. As an example, when the first image has a rectangular shape, the electronic apparatus 100 may identify the first area while maintaining the width to height ratio of the first image. As another example, when the first image has a circular shape, the electronic apparatus 100 may identify the first area while maintaining the curvature of the first image.

The electronic apparatus 100 may obtain the changed first image 1421 by changing the size of the first image 1411 rotated based on the identified first area. The electronic apparatus 100 may output the changed first image 1421 to the first area.

The electronic apparatus 100 may identify the remaining area except for the first area in the outputtable area. The electronic apparatus 100 may identify a second area in which the second image rotated in the remaining area may be displayed to be the largest. The electronic apparatus 100 may change the second image rotated based on the size of the second area. The electronic apparatus 100 may output the changed second image 1422 to the second area. Here, the electronic apparatus 100 may maintain a size ratio (e.g., width to height ratio) of the second image in identifying the second area. According to another embodiment, the electronic apparatus 100 may not maintain the size ratio of the second image in identifying the second area.

Figure 15:
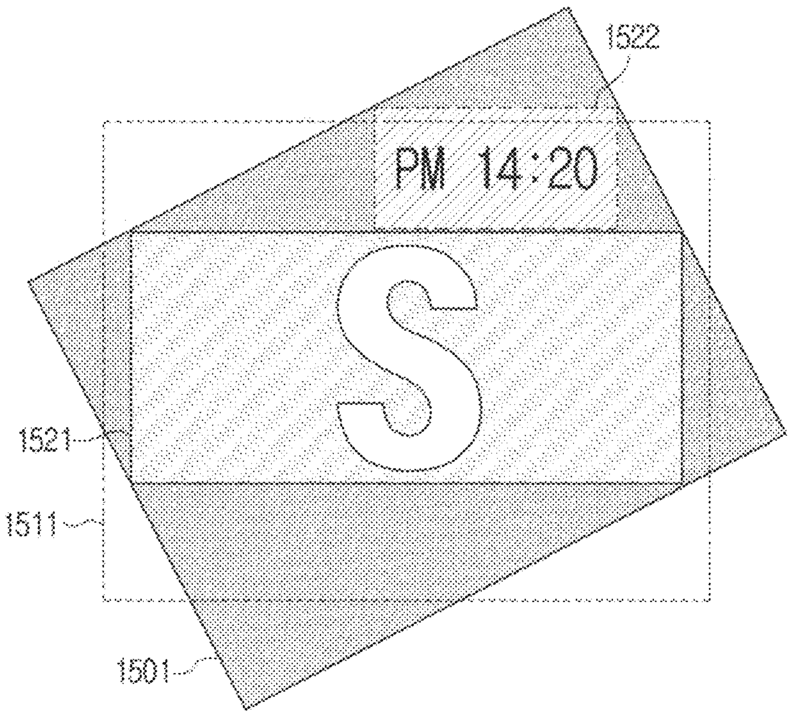
FIG. 15 is a diagram illustrating an operation of outputting a second image, according to one or more embodiments.

FIG. 15 is a diagram illustrating an operation of outputting a second image according to another embodiment.

Referring to FIG. 15, the electronic apparatus 100 may obtain a rotated first image 1511 by rotating a first image 1501 based on information about inclination. In addition, the electronic apparatus 100 may identify a first area in which the rotated first image 1511 is displayed to be largest out of an outputtable area. The electronic apparatus 100 may identify a first area based on a size of the rotated first image 1511. Specifically, the electronic apparatus 100 may identify the first area without maintaining a size ratio of the rotated first image 1511.

Since the rotated first image 1511 is beyond the outputtable area, the electronic apparatus 100 may reduce the size of the rotated first image 1511. Here, the electronic apparatus 100 may identify a first area in which the rotated first image 1511 may be output in a maximum size without maintaining a size ratio of the rotated first image 1511. For example, when the first image has a rectangular shape, the electronic apparatus 100 may identify the first area without maintaining the width to height ratio of the first image. As another example, when the first image has a circular shape, the electronic apparatus 100 may identify the first area without maintaining the curvature of the first image.

In addition, the electronic apparatus 100 may change a size of the rotated first image 1511 based on the identified first area and may obtain the changed first image 1521. The electronic apparatus 100 may output the changed first image 1521 to the first area.

The electronic apparatus 100 may identify the remaining area except for the first area in the outputtable area. The electronic apparatus 100 may identify a second area in which the second image rotated may be displayed to be the largest in the remaining area. The electronic apparatus 100 may change the rotated second image based on the size of the second area. In addition, the electronic apparatus 100 may output the changed second image 1522 to the second area. Here, the electronic apparatus 100 may maintain a size ratio (for example, width and height ratio) of the second image in identifying the second area. According to another embodiment, the electronic apparatus 100 may not maintain the size ratio of the second image in identifying the second area.

Figure 16:
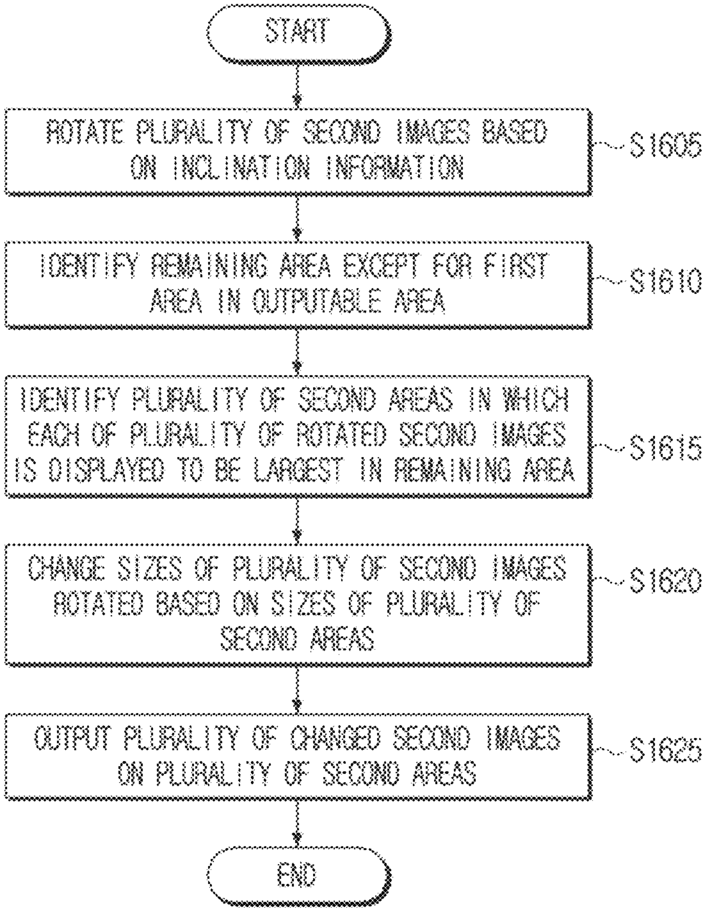
FIG. 16 is a flowchart illustrating an operation of changing a plurality of second images, according to one or more embodiments.

FIG. 16 is a flowchart illustrating an operation of changing a plurality of second images.

Referring to FIG. 16, the electronic apparatus 100 may output a plurality of second images to a projection surface. Specifically, the electronic apparatus 100 may rotate the plurality of second images based on the inclination information in operation S1605. For example, when the electronic apparatus 100 is inclined by five degrees in a counterclockwise direction based on a direction facing the projection surface, the electronic apparatus 100 may rotate each (based on a direction facing the projection surface) of the plurality of second images in a clockwise direction by five degrees.

Here, the electronic apparatus 100 may identify the remaining area except for the first area in the outputtable area in operation S1610. The operation of identifying the remaining area has been described with reference to FIG. 11. Although operation S1610 has been described as being performed after operation S1605, operation S1610 may be performed before operation S1605 according to another embodiment.

The electronic apparatus 100 may identify a plurality of second areas in which each of a plurality of rotated second images is displayed to be the largest in the remaining area (at least one remaining area) in operation S1615. The electronic apparatus 100 may display a plurality of second images in the remaining area. Here, the size of the area for displaying the plurality of second images may be different from the size of the area for displaying one second image.

For example, in an embodiment of displaying one second image, it is assumed that the size of the second area is 10. In an embodiment of displaying two second images, the size of one area between two second areas may be smaller than 10.

The electronic apparatus 100 may identify a plurality of second areas to display a plurality of second images. To be specific, the electronic apparatus 100 may identify the second areas for displaying a plurality of second images to be in the maximum size.

Then, the electronic apparatus 100 may change the sizes of the plurality of second images rotated based on the sizes of the plurality of second areas in operation S1620. For example, when the second image has a rectangular shape, the horizontal length and the vertical length of the second images may be changed based on the horizontal length and the vertical length of the second areas. As another example, when the second image has a circular shape, the radius lengths of the second images may be changed based on the radius lengths of the second areas.

The electronic apparatus 100 may output a plurality of changed second images on a plurality of second areas in operation S1625.

Figure 17:
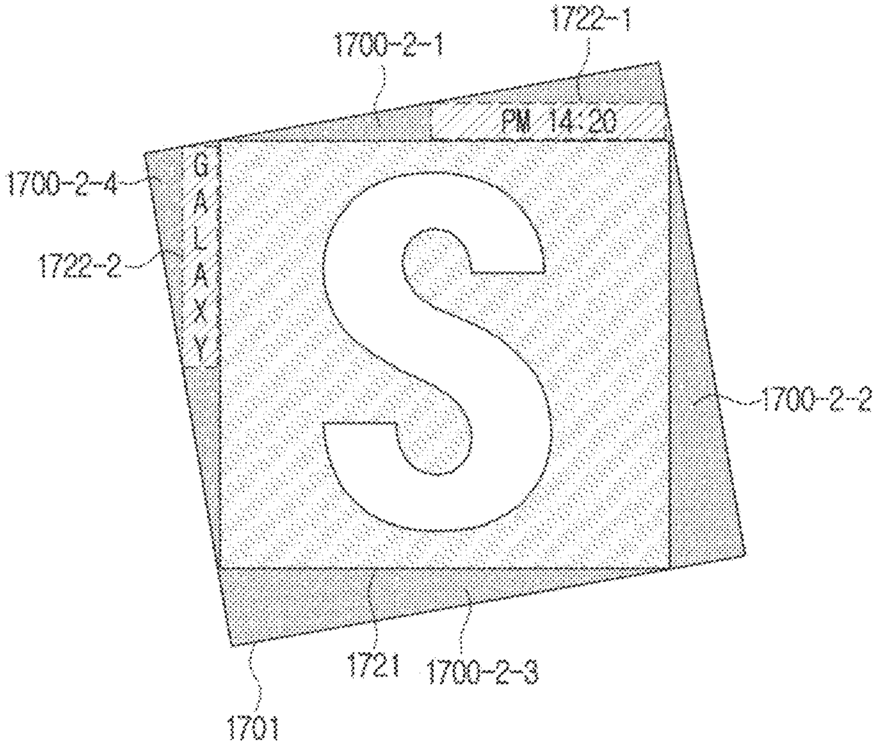
FIG. 17 is a diagram illustrating an operation of outputting a plurality of second images, according to one or more embodiments.

FIG. 17 is a diagram illustrating an operation of outputting a plurality of second images according to one or more embodiments.

Referring to FIG. 17, the electronic apparatus 100 may change (rotate and change size) of a first image 1701 and obtain the changed first image 1721. The electronic apparatus 100 may output the changed first image 1721 in the first area.

Here, the electronic apparatus 100 may identify a plurality of remaining areas other than the first area among the outputtable areas. When a plurality of remaining areas 1700-2-1, 1700-2-2, 1700-2-3, 1700-2-4 are identified, the electronic apparatus 100 may output a plurality of second images to different remaining areas.

The electronic apparatus 100 may output a plurality of second images 1722-1, 1722-2 to each of the plurality of second areas. For example, the electronic apparatus 100 may output a second image 1722-1 to a second area 1700-2-1 and a second image 1722-2 to a second area 1700-2-4.

The second image 1722-1 may include time information and may be output onto any one of the remaining areas 1700-2-1, 1700-2-2, 1700-2-3, 1700-2-4. In addition, the second image 1722-2 may be include advertisement information and may be output onto any one of the remaining areas 1700-2-1, 1700-2-2, 1700-2-3, 1700-2-4. Here, the area 1700-2-4 in which the second image 1722-2 is outputted may be different from the area 1700-2-1 in which the second image 1722-1 is outputted.

Figure 18:
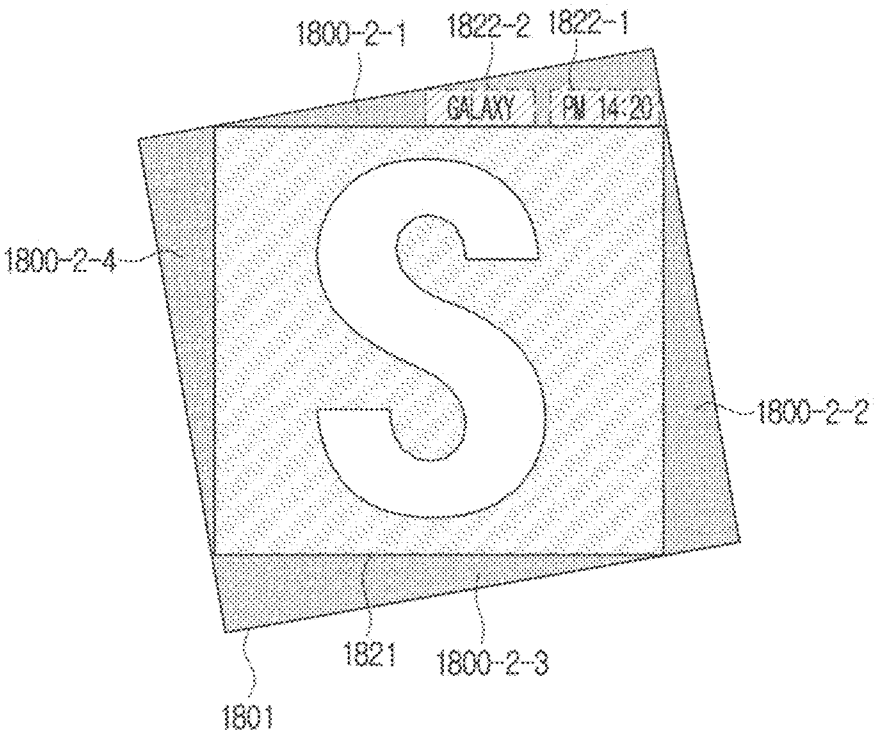
FIG. 18 is a view illustrating an operation of outputting a plurality of second images, according to one or more embodiments.

FIG. 18 is a view illustrating an operation of outputting a plurality of second images, according to another embodiment.

Referring to FIG. 18, the electronic apparatus 100 may change (rotate and change size) of the first image 1801 and may obtain the changed first image 1821. In addition, the electronic apparatus 100 may output the changed first image 1821 in the first area.

Here, the electronic apparatus 100 may identify a plurality of remaining areas other than the first area among the outputtable areas. Even when a plurality of remaining areas 1800-2-1, 1800-2-2, 1800-2-3, 1800-2-4 are identified, the electronic apparatus 100 may display a plurality of second images in one remaining area.

To be specific, the electronic apparatus 100 may display all of a plurality of second images 1822-1, 1822-2 in one remaining area 1800-2-1. Here, the size of the area where the second image 1822-1 is displayed may be smaller than the size of the area where the second image 1722-1 of FIG. 17 is displayed.

Figure 19:
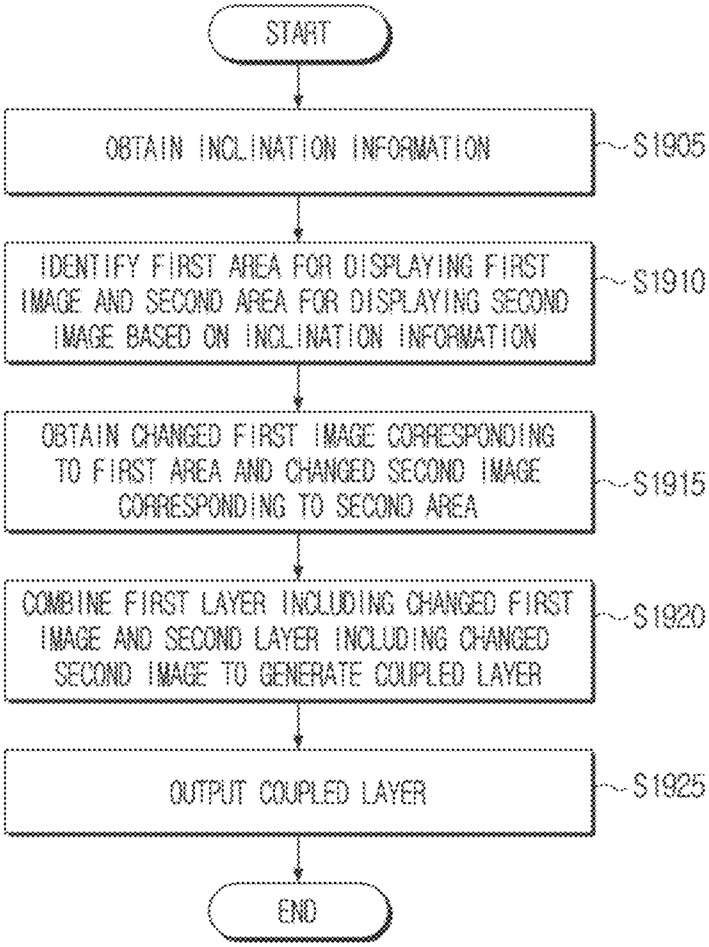
FIG. 19 is a flowchart illustrating an operation in which a first image and a second image are coupled into respective layers, according to one or more embodiments.

FIG. 19 is a flowchart illustrating an operation in which a first image and a second image are coupled into respective layers.

Referring to FIG. 19, the electronic apparatus 100 may obtain information about inclination in operation S1905. In addition, the electronic apparatus 100 may identify a first area for displaying the first image and a second area for displaying the second image based on the information in operation S1910. In addition, the electronic apparatus 100 may obtain a changed first image corresponding to the first area and a changed second image corresponding to the second area in operation S1915. Here, the changed first image and the changed second image may refer to an image of a state in which both a rotation operation and a size change operation are performed.

Here, the electronic apparatus 100 may couple a first layer including the changed first image and a second layer including the changed second image to generate a coupled layer in operation S1920. Specifically, the electronic apparatus 100 may obtain a first layer including a changed first image and a second layer including a second image. In addition, the electronic apparatus 100 may obtain a coupled layer by coupling the obtained first layer and the obtained second layer.

Here, the electronic apparatus 100 may output the obtained coupled layer in operation S1925. The coupled layer is one layer and may be a layer including both first image and second image.

Figure 20:
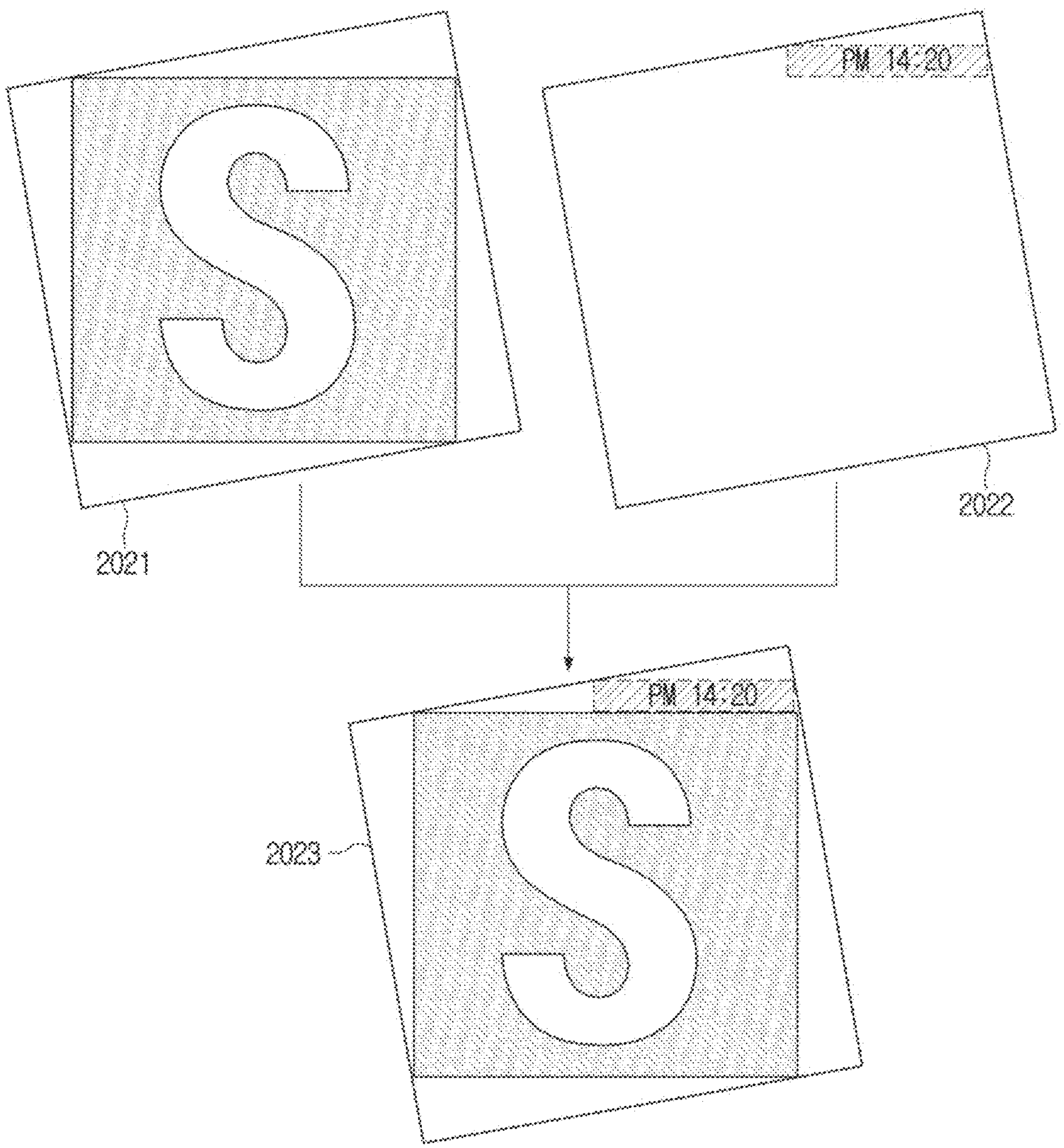
FIG. 20 is a diagram illustrating an operation in which a first image and a second image are coupled into respective layers, according to one or more embodiments.

FIG. 20 is a diagram illustrating an operation in which a first image and a second image are coupled into respective layers.

Referring to FIG. 20, the electronic apparatus 100 may couple first image and second image in one layer for outputting.

To be specific, the electronic apparatus 100 may obtain a first layer 2021 including the changed first image. In addition, the electronic apparatus 100 may obtain a second layer 2022 including the changed second image.

The electronic apparatus 100 may couple the first layer 2021 and the second layer 2022 to obtain a coupled layer 2023. In addition, the electronic apparatus 100 may output the obtained coupled layer 2023 to a projection surface.

Figure 21:
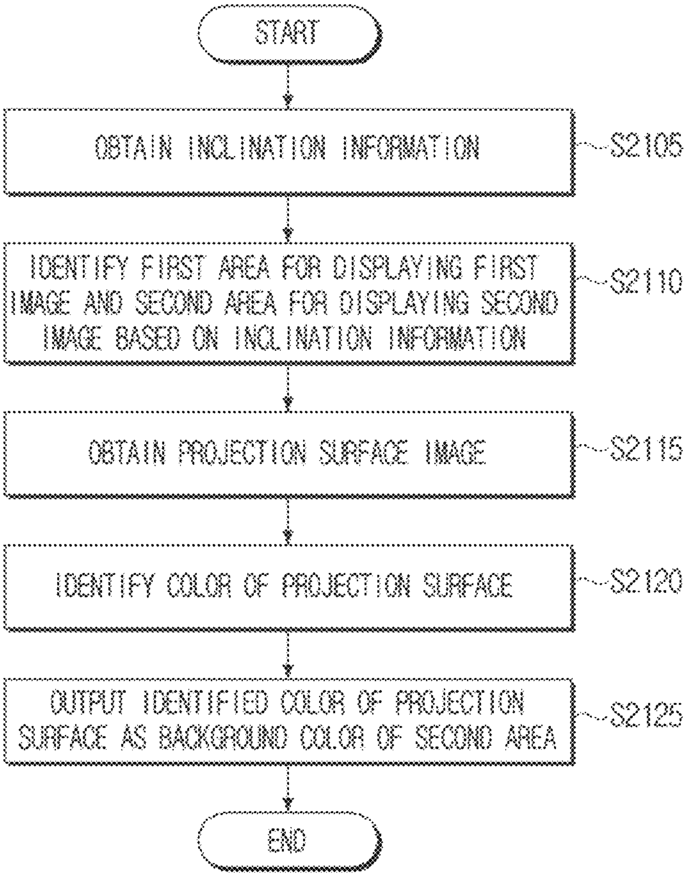
FIG. 21 is a flowchart illustrating an operation of identifying a background color of a second area by identifying a color of a projection surface, according to one or more embodiments.

FIG. 21 is a flowchart illustrating an operation of identifying a background color of a second area by identifying a color of a projection surface.

Referring to FIG. 21, the electronic apparatus 100 may obtain information about inclination in operation S2105. In addition, the electronic apparatus 100 may identify a first area for displaying the first image and a second area for displaying the second image based on the inclination information in operation S2110.

Here, the electronic apparatus 100 may obtain a projection surface image in operation S2115. To be specific, the electronic apparatus 100 may include an image sensor, and may obtain a projection surface image by photographing the projection surface through the image sensor.

Here, the electronic apparatus 100 may identify color of the projection surface based on the projection surface image in operation S2120. In addition, the electronic apparatus 100 may output the color of the identified projection surface as a background color of the second area in operation S2125.

If the color of the projection surface is not a single color and may have a predetermined pattern, the electronic apparatus 100 may identify the pattern of the projection surface and may output the pattern same as the identified pattern of the projection surface as a background pattern of the second area.

Figure 22:
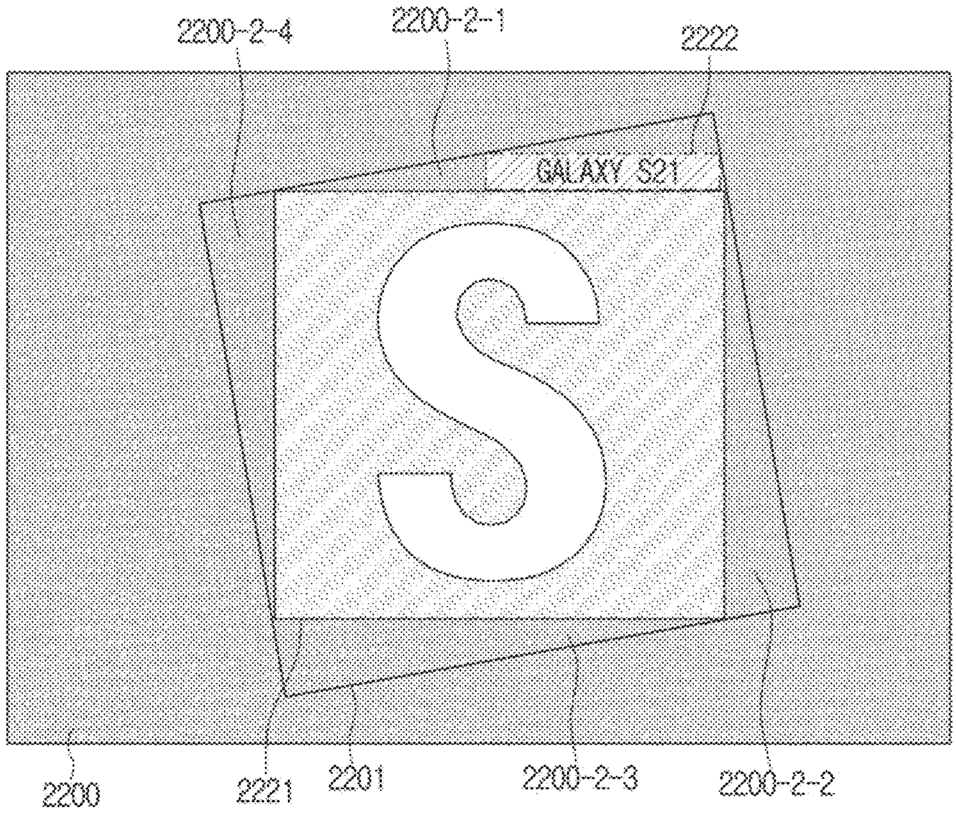
FIG. 22 is a diagram illustrating an operation of identifying a background color of a second area by identifying a color of a projection surface, according to one or more embodiments.

FIG. 22 is a diagram illustrating an operation of identifying a background color of a second area by identifying a color of a projection surface.

Referring to FIG. 22, the electronic apparatus 100 may obtain a changed first image 2221 by changing a first image 2201. In addition, the electronic apparatus 100 may output the changed first image 2221 to the first area. In addition, the electronic apparatus 100 may identify the remaining areas 2200-2-1, 2200-2-2, 2200-2-3, 2200-2-4 except for the first area in the outputtable area. In addition, the electronic apparatus 100 may identify a second area to output a second image in the remaining area. In addition, the electronic apparatus 100 may output the changed second image to the second area.

The electronic apparatus 100 may photograph an image of the projection surface 2200 by using an image sensor. Here, the electronic apparatus 100 may obtain a projection surface image. The electronic apparatus 100 may identify a color of the projection surface 2200 based on the projection surface image. In addition, the electronic apparatus 100 may determine the color of the identified projection surface 2200 as a background color of the remaining areas 2200-2-1, 2200-2-2, 2200-2-3, 2200-2-4. Specifically, the electronic apparatus 100 may output the background color of the remaining areas 2200-2-1, 2200-2-2, 2200-2-3, 2200-2-4 as the color of the identified projection surface 2200.

If, when the first image and the second image are changed and output unlike an embodiment of FIG. 22, the space (or region) between the area in which the first image and the second image are not output and the projection surface 2200 may be unnatural, since the outputtable area itself is inclined.

However, according to an embodiment of FIG. 22, the color of the projection surface 2200 and the color of the remaining areas 2200-2-1, 2200-2-2, 2200-2-3, 2200-2-4 may be matched, and thus the first image and the second image may naturally stand out. In addition, even though the electronic apparatus 100 is inclined, a first image and a second image which are not inclined may be naturally outputted.

Figure 23:
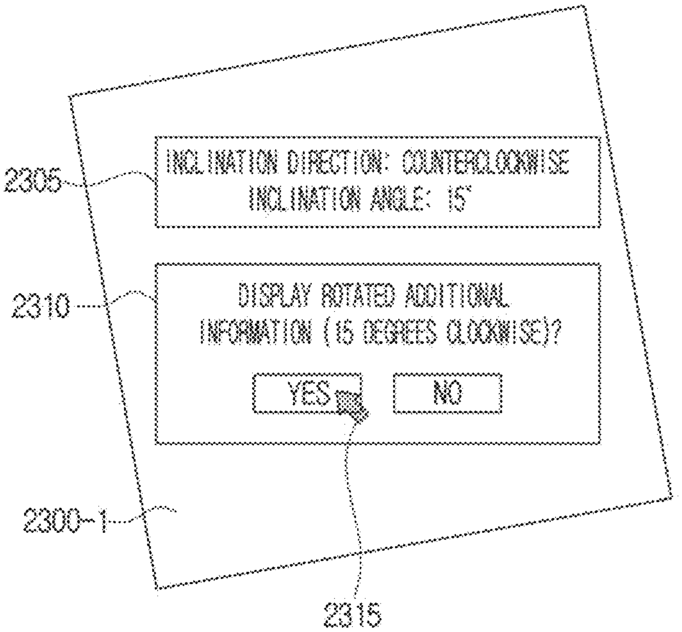
FIG. 23 is a diagram illustrating a user interface (UI) for guiding a change of a second image, according to one or more embodiments.

FIG. 23 is a diagram illustrating a user interface (UI) for guiding a change of a second image, according to one or more embodiments.

Referring to FIG. 23, the electronic apparatus 100 may display a UI for guiding a change of a second image to an outputtable area 2300-1. Here, the outputtable area 2300-1 may be rotated clockwise or counterclockwise with respect to the projection surface according to the inclination of the electronic apparatus 100.

Here, the electronic apparatus 100 may display a UI 2305 including inclination information of the electronic apparatus 100. Here, the inclination information may include at least one of an inclination direction or an inclination angle. The user may recognize the inclination of the electronic apparatus 100 through the UI 2305.

The electronic apparatus 100 may output a UI 2310 for guiding whether to rotate and output the second image. Here, the UI 2310 may include information for requesting a user input for rotating the second image (or additional information). In addition, the UI 2310 may include information (for example, 15 degrees in a clockwise direction) corresponding to the direction and angle of rotating the second image. Here, when a user input for selecting a location corresponding to the UI 2310 is identified through the selection cursor 2315, the electronic apparatus 100 may rotate and display the second image (by 15 degrees in the clockwise direction).

UIs 2305, 2310 may be output in a rotated state based on the inclination information like FIG. 23. As another example, the UIs 2305, 2310 may be output in a not-rotated state.

Figure 24:
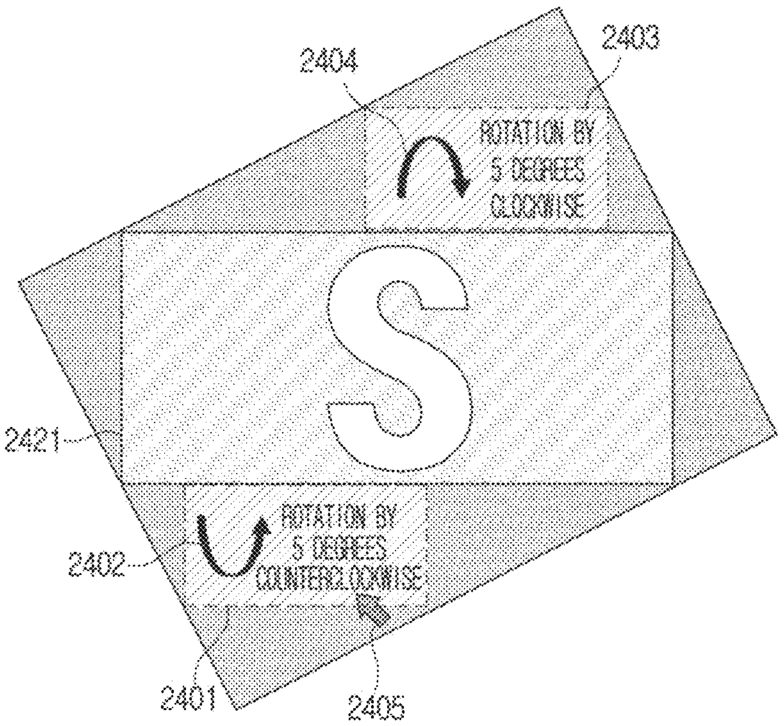
FIG. 24 is a diagram illustrating a user interface (UI) for guiding a change of a second image, according to one or more embodiments.

FIG. 24 is a diagram illustrating a user interface (UI) for guiding a change of a second image, according to another embodiment.

Referring to FIG. 24, the electronic apparatus 100 may output the first image 2421 changed based on the inclination information to the first area. In addition, the electronic apparatus 100 may output UIs 2401 and 2402 for guiding to additionally rotate the output first image 2321.

Here, the UIs 2401, 2402 may include the inclination direction and the inclination angle, and may display icons 2402, 2404 related to the inclination direction. Here, the icon 2402 may have different shapes according to the inclination direction.

For example, the UI 2401 may include text information about rotating five degrees in the counterclockwise direction, and may include an icon 2402 corresponding to the counterclockwise direction. The UI 2403 may include text information about rotating 5 degrees in the clockwise direction, and may include an icon 2404 corresponding to the clockwise direction. Here, the icon 2402 and the icon 2404 may have different shapes depending on the inclination direction.

Icons 2402, 2404 may have different lengths according to the inclination angle. The electronic apparatus 100 may output the length of the icons 2402, 2404 to be longer as the inclination angle is larger.

The electronic apparatus 100 may identify a user input through a cursor 2405. For example, when the cursor 2405 receives a user input for selecting the UI 2401, the electronic apparatus 100 may perform an operation (rotation of the output image in a counterclockwise direction by five degrees) corresponding to the UI 2401.

Here, when a user input for rotating the first image 2421 is additionally received, the electronic apparatus 100 may identify a new first area in which the first image 2421 is additionally rotated and output. In addition, the electronic apparatus 100 may output a first image additionally rotated to a new first area.

Figure 25:
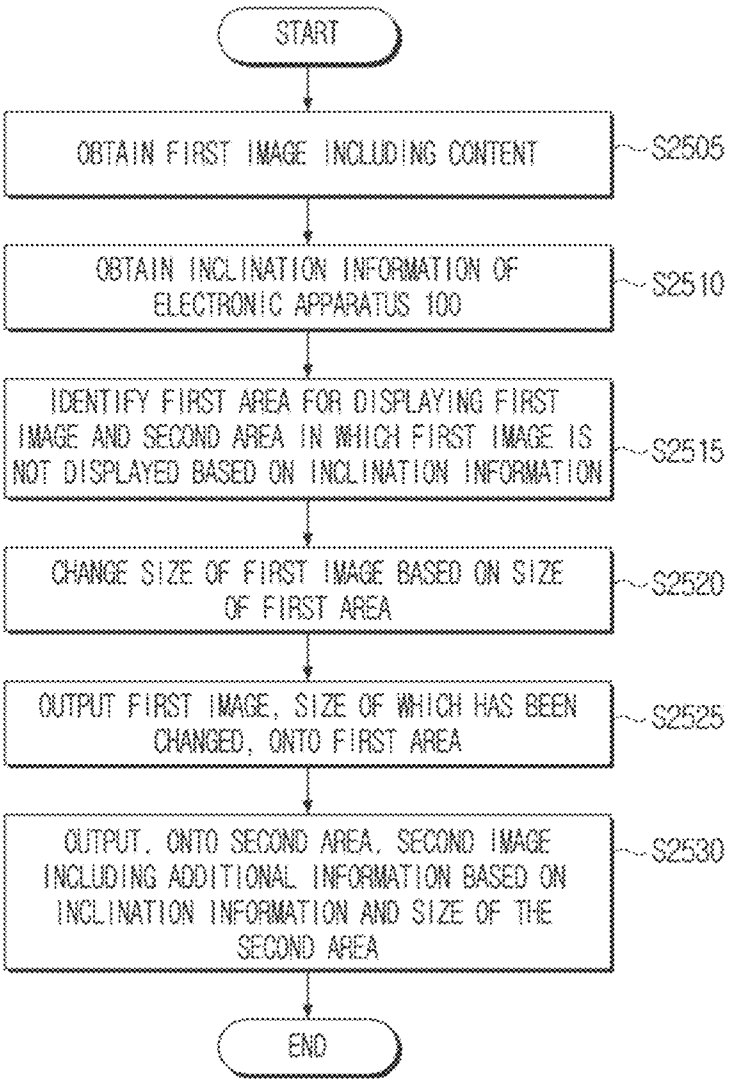
FIG. 25 is a flowchart illustrating a method for controlling the electronic apparatus, according to one or more embodiments.

FIG. 25 is a flowchart illustrating a method for controlling the electronic apparatus according to one or more embodiments.

Referring to FIG. 25, the method of controlling the electronic apparatus 100 to output an image onto a projection surface includes obtaining a first image including a content in operation S2505, obtaining inclination information of the electronic apparatus 100 in operation S2510, identifying a first area for displaying the first image and a second area in which the first image is not displayed based on the inclination information in operation S2515, changing size of the first image based on the size of the first area in operation S2520, outputting the first image, the size of which has been changed, onto the first area in operation S2525, and outputting, onto the second area, a second image including additional information based on the inclination information and the size of the second area in operation S2530.

The changing the size of the first image in operation S2520 may include rotating the first image based on the inclination information, correcting the first image by changing width and height of the first image based on the width and height of the first area, and the outputting the first image in operation S2525 may include outputting the corrected first image corresponding to the first area.

The method may further include rotating the second image based on the inclination information, correcting the second image by changing size of the second image based on the size of the second area, and the outputting the second image in operation S2530 may include outputting the corrected second image corresponding to the second area.

The inclination information may include an inclination direction, and the method may further include correcting the first image and the second image by rotating the images in a reverse direction of the inclination direction, and the inclination direction may be a clockwise direction or a counterclockwise direction based on a direction facing the projection surface.

The sensor unit 113 of the electronic apparatus 100 may include at least one of an inclination sensor for sensing inclination of the electronic apparatus 100 or an image sensor for photographing an image, and the obtaining the inclination information in operation S2510 may include obtaining the inclination direction based on the sensing data obtained from the sensor unit.

The outputting the second image in operation S2530 may include, based on a plurality of second areas, obtaining size of the plurality of second areas, and outputting the second image in an area having largest size among the plurality of second areas.

The identifying the first area and the second area in operation S2515 may include identifying an outputtable area in which an image is output through the projection part, identifying the first area to which the corrected first image is output, and identifying an area excluding the first area from among the outputtable area as the second area.

The method may further include outputting a background color of the second area as a predetermined color.

The sensor unit 113 may include an image sensor for photographing an image, and the outputting the background color of the second area to a predetermined color may include identifying color of the projection surface based on an image photographed through the image sensor, or identifying the predetermined color based on the identified color of the projection surface.

The control method may output inclination information and a guide UI for rotating the second image.

The method for controlling an electronic apparatus as shown in FIG. 25 may be executed on an electronic apparatus having the configuration of FIG. 2A or 2B, and may also be executed on an electronic apparatus having other configurations.

The methods according to various embodiments may be implemented as a format of software or application installable to a related art electronic apparatus.

The methods according to various embodiments may be implemented by software upgrade of a related art electronic apparatus, or hardware upgrade only.

Also, various embodiments of the disclosure described above may be performed through an embedded server provided in an electronic apparatus, or through an external server of at least one of an electronic apparatus and a display device.

Meanwhile, various embodiments of the disclosure may be implemented in software, including instructions stored on machine-readable storage media readable by a machine (e.g., a computer). An apparatus may call instructions from the storage medium, and execute the called instruction, including an image processing apparatus (for example, image processing apparatus A) according to the disclosed embodiments. When the instructions are executed by a processor, the processor may perform a function corresponding to the instructions directly or using other components under the control of the processor. The instructions may include a code generated by a compiler or a code executable by an interpreter. A machine-readable storage medium may be provided in the form of a non-transitory storage medium. Herein, the "non-transitory" storage medium may not include a signal but is tangible, and does not distinguish the case in which a data is semi-permanently stored in a storage medium from the case in which a data is temporarily stored in a storage medium.

According to one or more embodiments, the method according to the above-described embodiments may be included in a computer program product. The computer program product may be traded as a product between a seller and a consumer. The computer program product may be distributed online in the form of machine-readable storage media (e.g., compact disc read only memory (CD-ROM)) or through an application store (e.g., Play Store™) or distributed online directly. In the case of online distribution, at least a portion of the computer program product may be at least temporarily stored or temporarily generated in a server of the manufacturer, a server of the application store, or a machine-readable storage medium such as memory of a relay server.

According to various embodiments, the respective elements (e.g., module or program) of the elements mentioned above may include a single entity or a plurality of entities. According to embodiments, at least one element or operation from among the corresponding elements mentioned above may be omitted, or at least one other element or operation may be added. Alternatively or additionally, a plurality of components (e.g., module or program) may be combined to form a single entity. In this case, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

While various embodiments have been illustrated and described, the disclosure is not limited to specific embodiments or the drawings, and it will be understood by those of ordinary skill in the art that various changes in form and details may be made therein without departing from the spirit and scope of the disclosure, including the appended claims and their equivalents.

What is claimed is:

1. An electronic apparatus comprising:

a memory;

a sensor;

a projection part configured to output an image onto a projection surface; and at least one processor configured to:

obtain a first image including a content, obtain inclination information of the electronic apparatus using the sensor, identify a first area in which the first image is displayed and a second area in which the first image is not displayed based on the inclination information, change the first image based on the inclination information and a size of the first area, control the projection part to output the changed first image onto the first area, and control the projection part to output, onto the second area, a second image including additional information, wherein the additional information is based on the inclination information and a size of the second area.

2. The electronic apparatus of claim 1, wherein the at least one processor is further configured to:

rotate the first image based on the inclination information, adjust the first image by changing a width and a height of the first image based on a width and a height of the first area, and control the projection part to output the adjusted first image corresponding to the first area.

3. The electronic apparatus of claim 1, wherein the at least one processor is further configured to:

rotate the second image based on the inclination information, and adjust the second image by changing a size of the second image based on the size of the second area, and control the projection part to output the adjusted second image corresponding to the second area.

4. The electronic apparatus of claim 1, wherein the inclination information comprises an inclination direction, wherein the at least one processor is further configured to adjust the first image and the second image by rotating the first image and the second image in a reverse direction of the inclination direction, and wherein the inclination direction is a clockwise direction or a counterclockwise direction based on a direction that the projection surface faces.

5. The electronic apparatus of claim 4, wherein the sensor comprises at least one of an inclination sensor for sensing inclination of the electronic apparatus or an image sensor for capturing an image, and wherein the at least one processor is further configured to obtain the inclination direction based on sensing data obtained from the sensor.

6. The electronic apparatus of claim 2, wherein the at least one processor is further configured to, based on a plurality of second areas, obtain a size of the plurality of second areas, and control the projection part to output the second image in the second area having a largest size among the plurality of second areas.

7. The electronic apparatus of claim 2, wherein the at least one processor is further configured to:

identify an output area in which an image is output through the projection part, identify the first area to which the adjusted first image is output, and identify, as the second area, an area excluding the first area from among the output area.

8. The electronic apparatus of claim 1, wherein the at least one processor is configured to control the projection part to output a background color of the second area as a predetermined color.

9. The electronic apparatus of claim 8, wherein the sensor comprises an image sensor for capturing an image, wherein the at least one processor is configured to:

identify a color of the projection surface based on the image captured through the image sensor, and identify the predetermined color based on the identified color of the projection surface.

10. The electronic apparatus of claim 1, wherein the at least one processor is further configured to control the projection part to output the inclination information and a guide user interface to rotate the second image.

11. A method of controlling an electronic apparatus to output an image onto a projection surface, the method comprising:

obtaining a first image including a content;

obtaining inclination information of the electronic apparatus using a sensor;

identifying a first area for displaying the first image and a second area in which the first image is not displayed based on the inclination information;

changing the first image based on the inclination information and a size of the first area;

outputting the changed first image onto the first area; and outputting, onto the second area, a second image including additional information, wherein the additional information is based on the inclination information and a size of the second area.

12. The method of claim 11, wherein the changing the size of the first image comprises rotating the first image based on the inclination information, adjusting the first image by changing a width and a height of the first image based on a width and a height of the first area, and wherein the outputting the first image comprises outputting the adjusted first image corresponding to the first area.

13. The method of claim 11, wherein the method further comprises:

rotating the second image based on the inclination information, adjusting the second image by changing a size of the second image based on the size of the second area, and wherein the outputting the second image comprises outputting the adjusted second image corresponding to the second area.

14. The method of claim 11, wherein the inclination information comprises an inclination direction, wherein the method further comprises adjusting the first image and the second image by rotating the first image and the second image in a reverse direction of the inclination direction, and wherein the inclination direction is a clockwise direction or a counterclockwise direction based on a direction that the projection surface faces.

15. The method of claim 14, wherein the sensor comprises at least one of an inclination sensor for sensing inclination of the electronic apparatus or an image sensor for capturing an image, and wherein the obtaining the inclination information comprises obtaining the inclination direction based on sensing data obtained from the inclination sensor.

* * * * *